(12) United States Patent
Takahashi et al.

(10) Patent No.: US 10,048,850 B2
(45) Date of Patent: Aug. 14, 2018

(54) INFORMATION PROCESSING APPARATUS AND INFORMATION PROCESSING METHOD

(71) Applicant: SONY CORPORATION, Tokyo (JP)

(72) Inventors: Masahiro Takahashi, Kanagawa (JP); Keiichi Yoshioka, Tokyo (JP); Ayaka Tamura, Tokyo (JP); Satoshi Akagawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 144 days.

(21) Appl. No.: 15/021,587

(22) PCT Filed: Oct. 30, 2014

(86) PCT No.: PCT/JP2014/005514
§ 371 (c)(1),
(2) Date: Mar. 11, 2016

(87) PCT Pub. No.: WO2015/068367
PCT Pub. Date: May 14, 2015

(65) Prior Publication Data
US 2016/0239195 A1   Aug. 18, 2016

(30) Foreign Application Priority Data

Nov. 7, 2013   (JP) .................................. 2013-231280

(51) Int. Cl.
*G06F 15/00* (2006.01)
*G06F 13/00* (2006.01)
(Continued)

(52) U.S. Cl.
CPC ........ *G06F 3/04847* (2013.01); *G06T 11/206* (2013.01); *H04N 5/23216* (2013.01); *G06T 2200/24* (2013.01)

(58) Field of Classification Search
CPC ....................................................... H04N 5/02
(Continued)

(56) References Cited

U.S. PATENT DOCUMENTS

| | | | | |
|---|---|---|---|---|
| 5,908,467 A | * | 6/1999 | Barrett | G06F 17/30899 707/999.002 |
| 2010/0296806 A1 | * | 11/2010 | Seo | G03B 7/003 396/236 |
| 2015/0169169 A1 | * | 6/2015 | Andersson | G06F 3/0488 715/765 |

FOREIGN PATENT DOCUMENTS

| | | |
|---|---|---|
| JP | 2011-009966 A | 1/2011 |
| JP | 2011-197090 A | 10/2011 |

(Continued)

OTHER PUBLICATIONS

Office Action for JP Patent Application No. 2013-231280, dated Feb. 21, 2017, 4 pages of Office Action.

(Continued)

*Primary Examiner* — Kevin Nguyen
(74) *Attorney, Agent, or Firm* — Chip Law Group

(57) ABSTRACT

An electronic apparatus and a non-transitory computer readable medium are disclosed. The electronic apparatus comprising: a processor; and a memory having program code stored thereon, the program code being such that, when it is executed by the processor, it causes the processor to: control a display of a first parameter-setting image that relates to values of one or more parameters related to imaging, the first parameter-setting image comprising a graph and an indicator point that is movable by user input, where the values of the one or more parameters related to imaging are set based on a location of the indicator point in the graph; and display, in association with the first parameter-setting image, a second (Continued)

parameter-setting image that relates to values of at least one additional parameter related to imaging.

20 Claims, 19 Drawing Sheets

(51) Int. Cl.
    *G06F 3/0484*     (2013.01)
    *H04N 5/232*     (2006.01)
    *G06T 11/20*     (2006.01)

(58) Field of Classification Search
    USPC .................................. 715/783–765, 851–853
    See application file for complete search history.

(56) References Cited

FOREIGN PATENT DOCUMENTS

| | | |
|---|---|---|
| JP | 2012-095247 A | 5/2012 |
| JP | 2013-073466 A | 4/2013 |

OTHER PUBLICATIONS

Office Action for EP Patent Application No. 14805685.6, dated Mar 10, 2017, 6 pages of Office Action.
Office Action for JP Patent Application No. 2013-231280, dated Oct. 3, 2017, 4 pages of Office Action and 3 pages of English Translation.
Office Action for JP Patent Application No. 2018-001038 dated May 8, 2018, 03 pages of Office Action and 03 pages of English Translation.

\* cited by examiner

[Fig. 1]
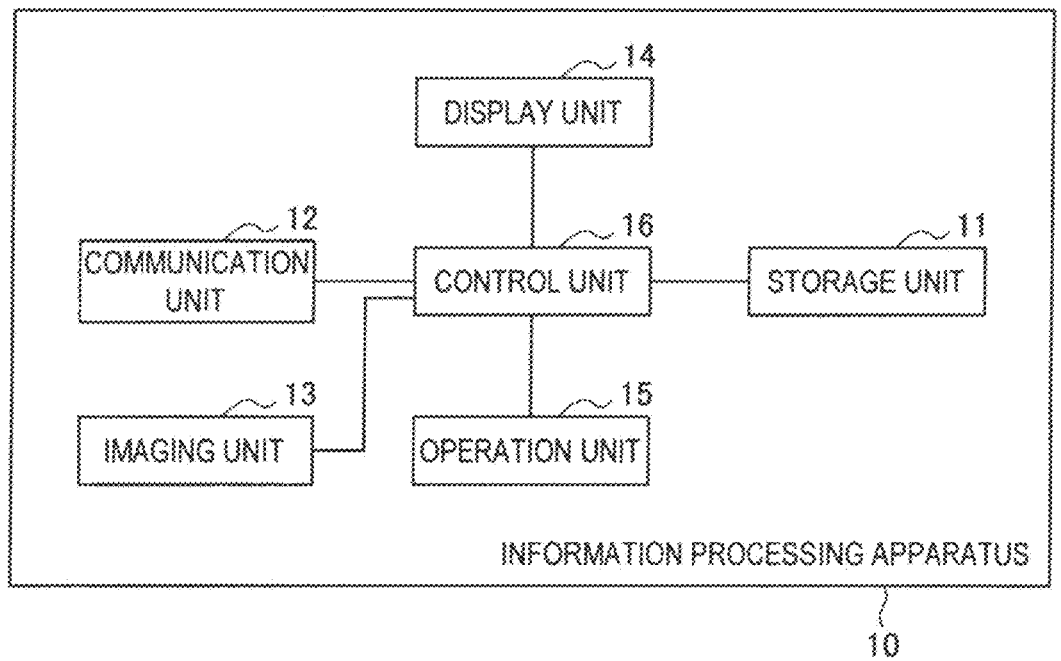
[Fig. 2]
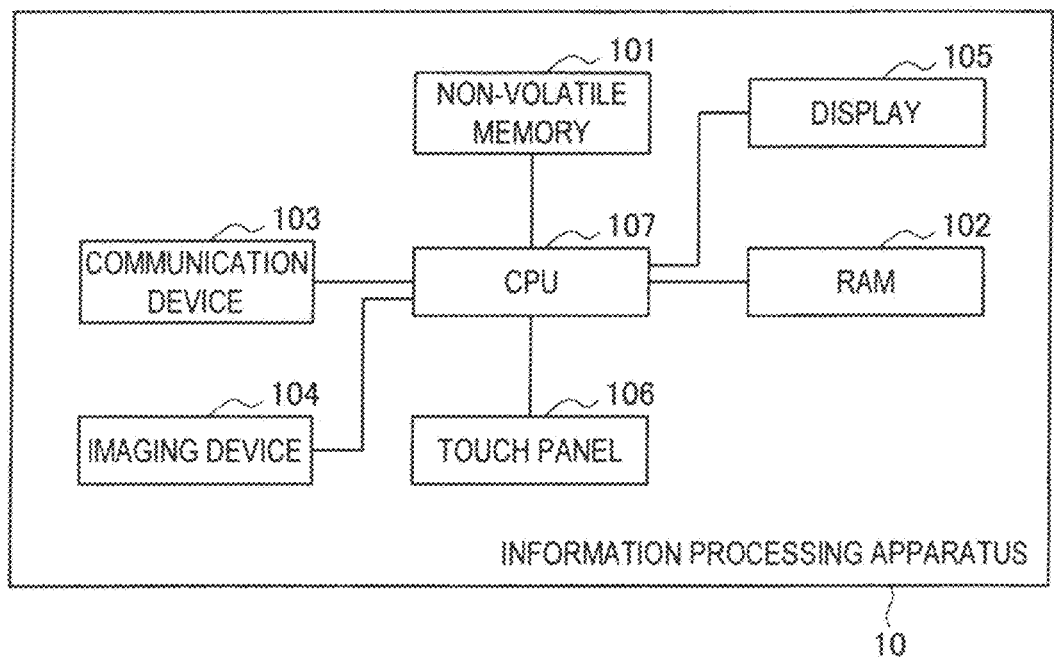

[Fig. 3]
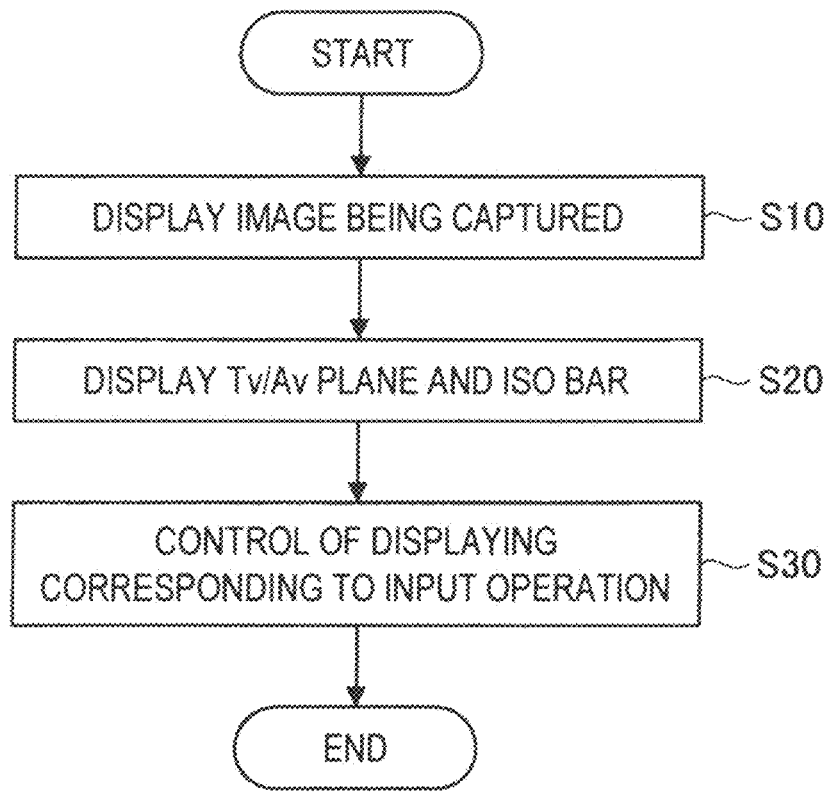

[Fig. 4]
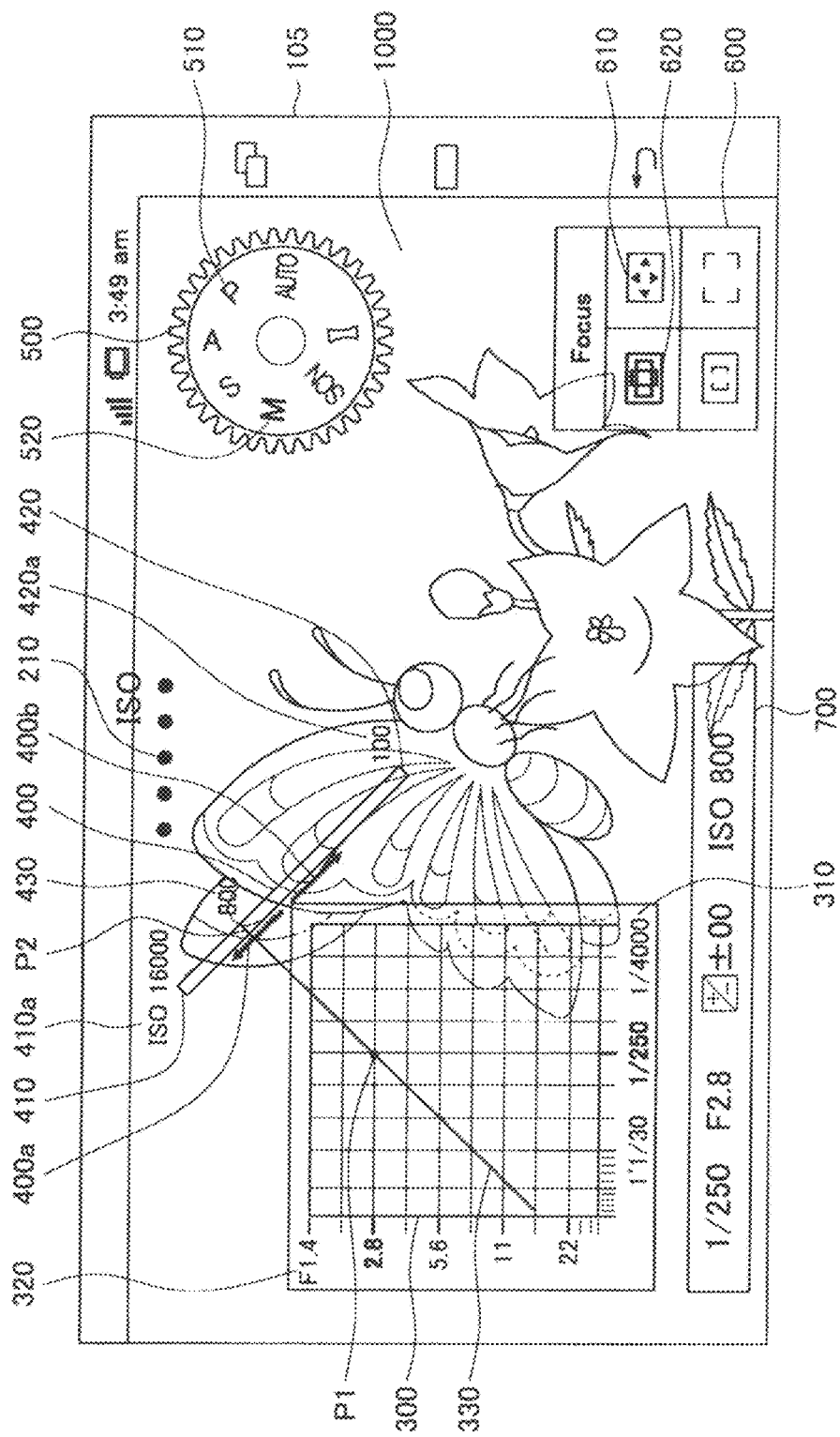

[Fig. 5]
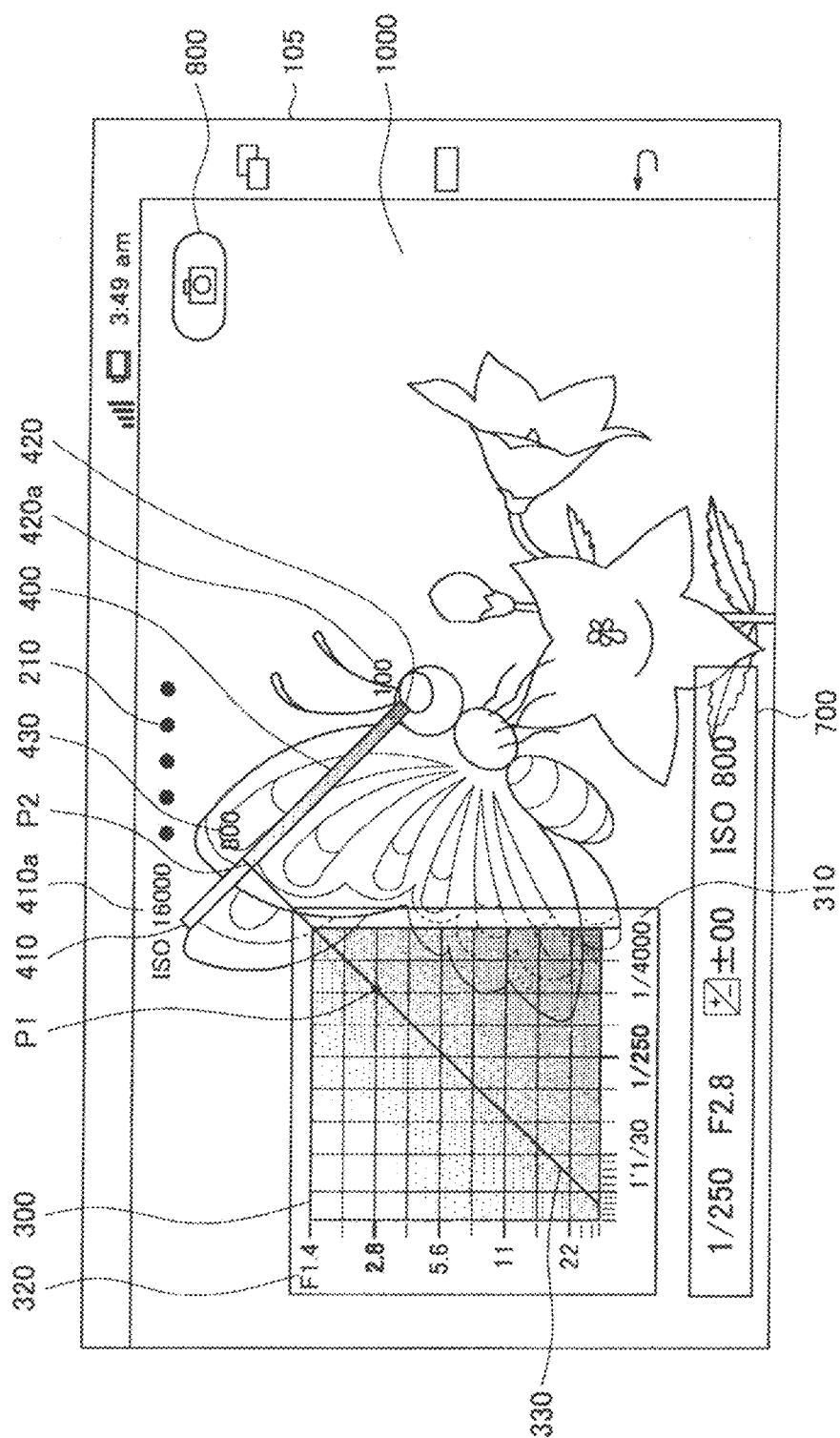

[Fig. 6]
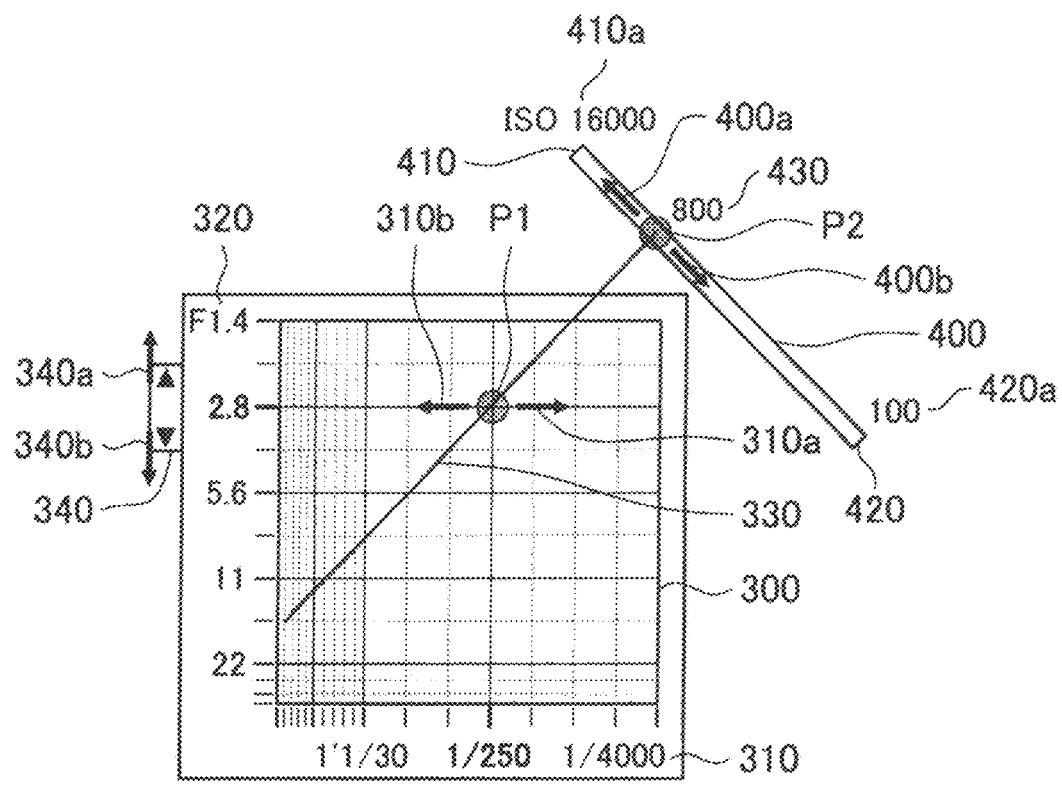

[Fig. 7]
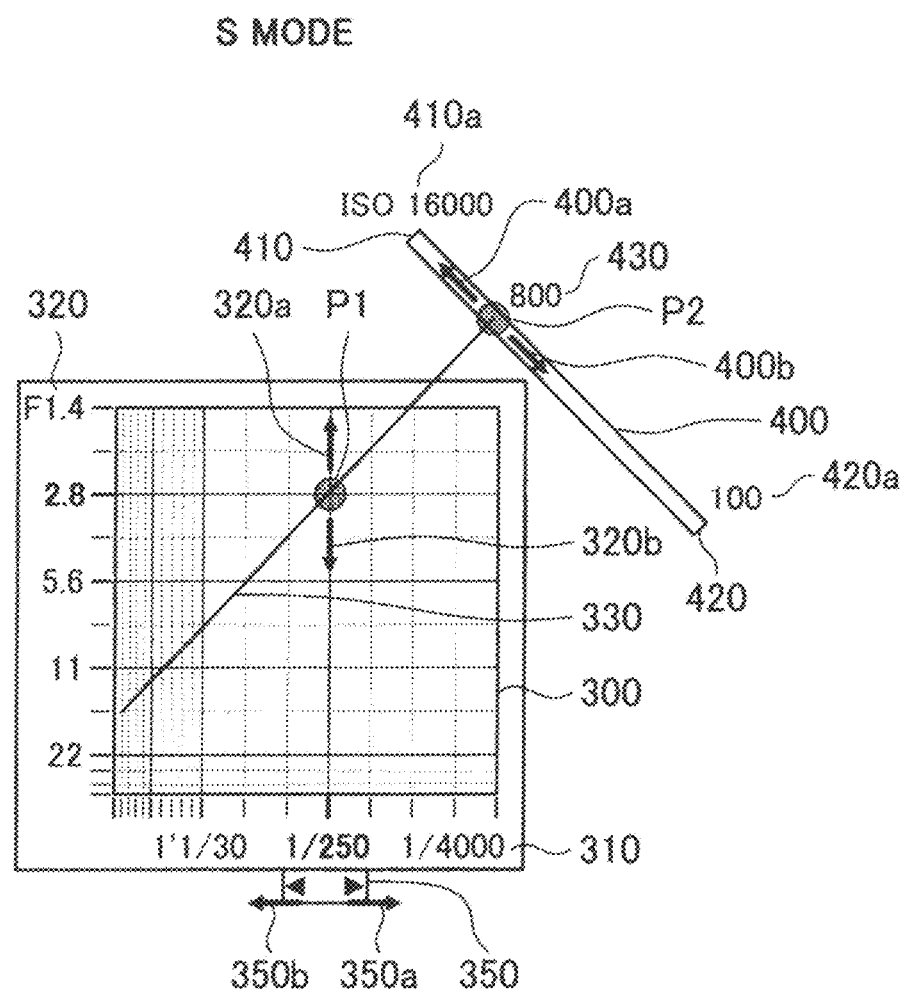

[Fig. 8]
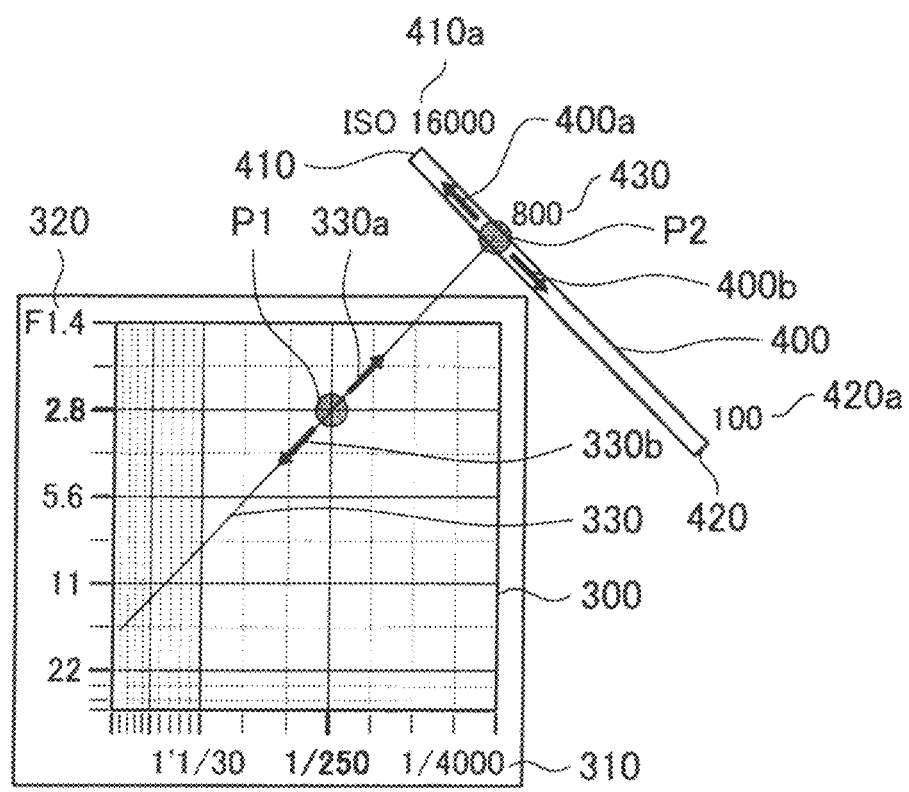

[Fig. 9]
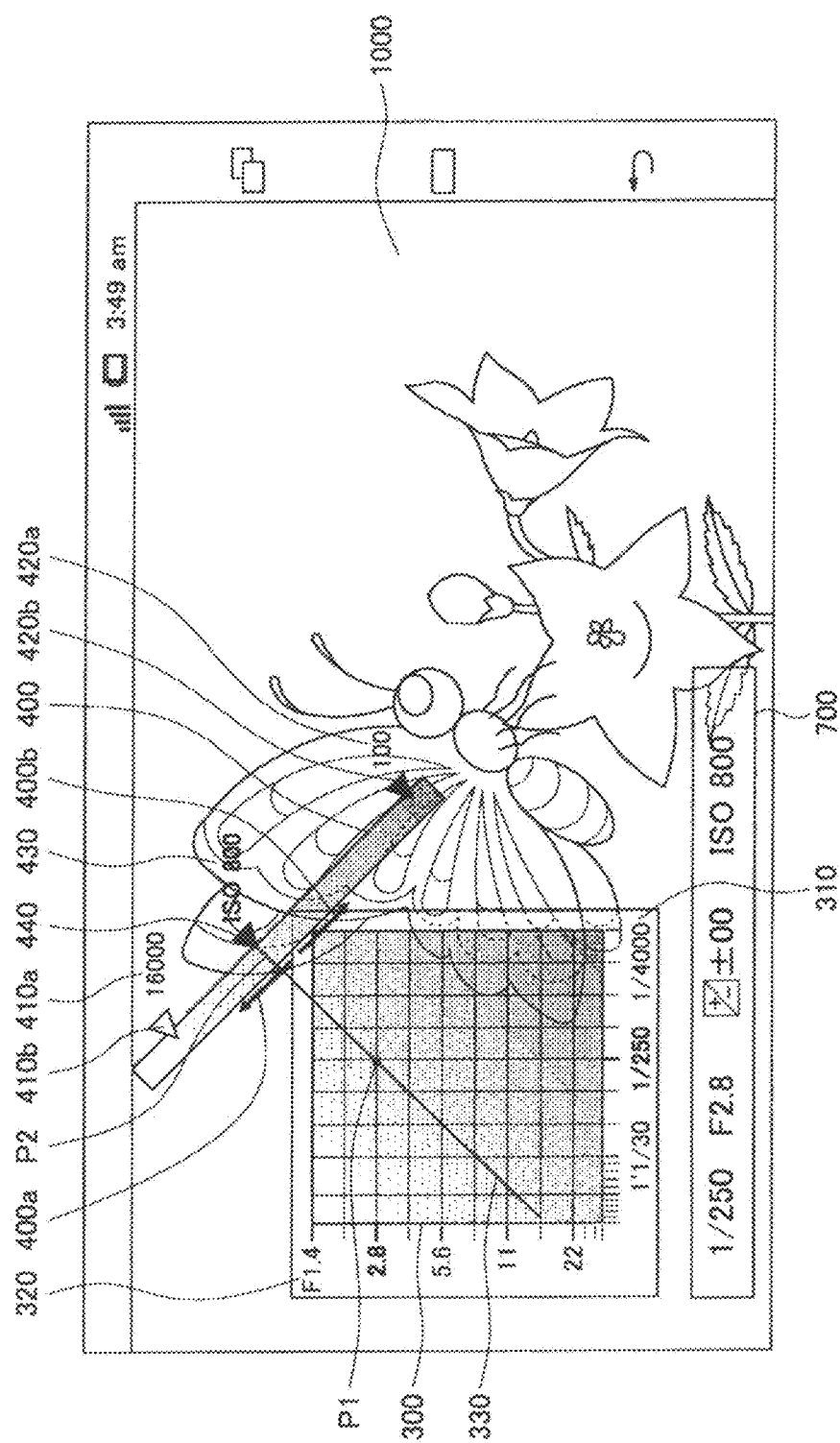

[Fig. 10]
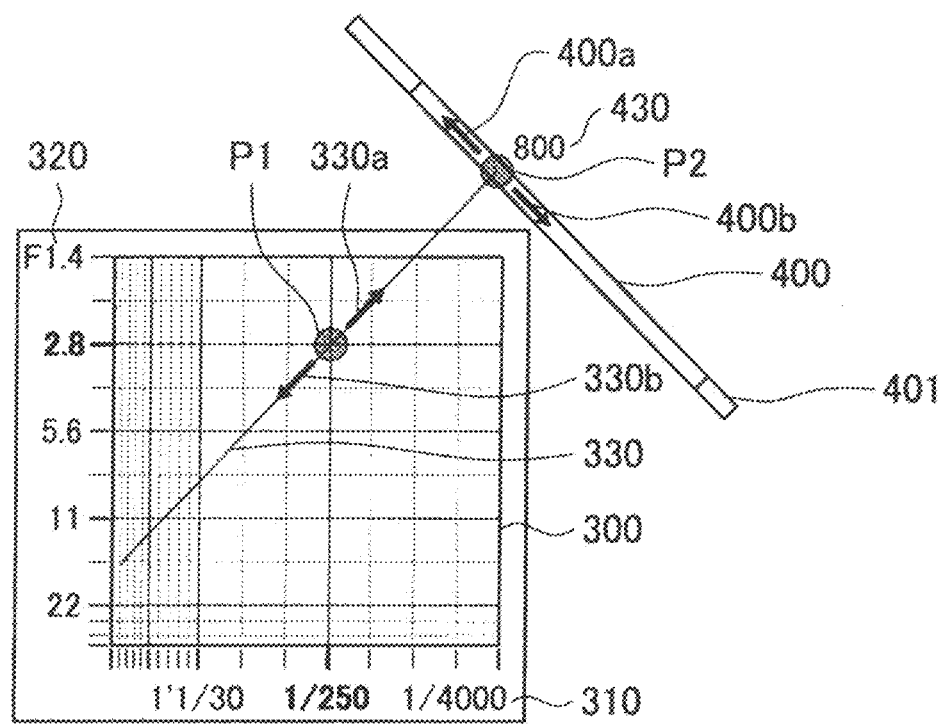
[Fig. 11]
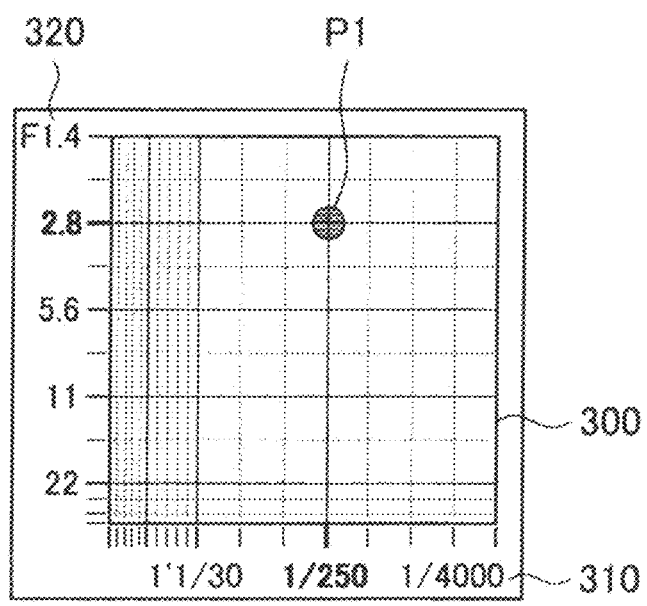

[Fig. 12]
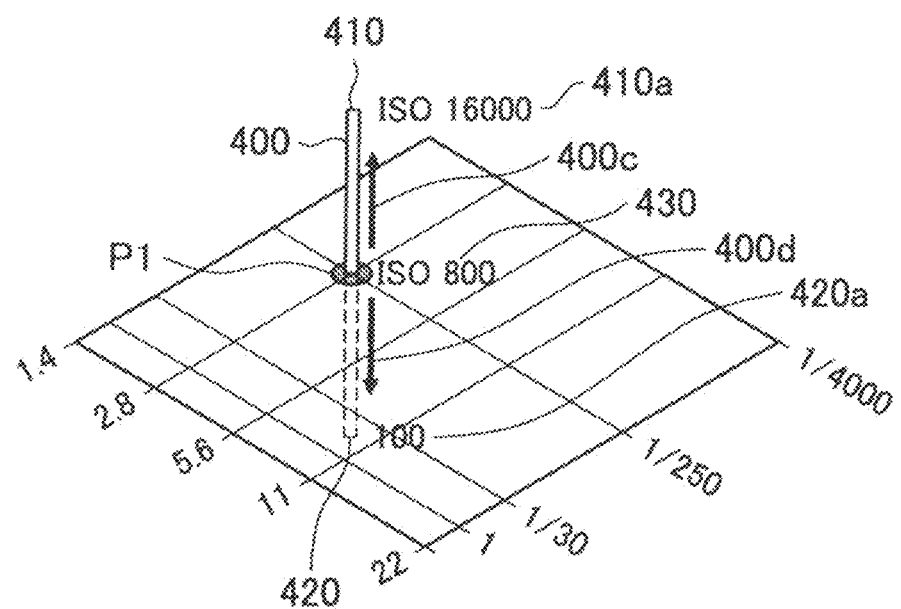

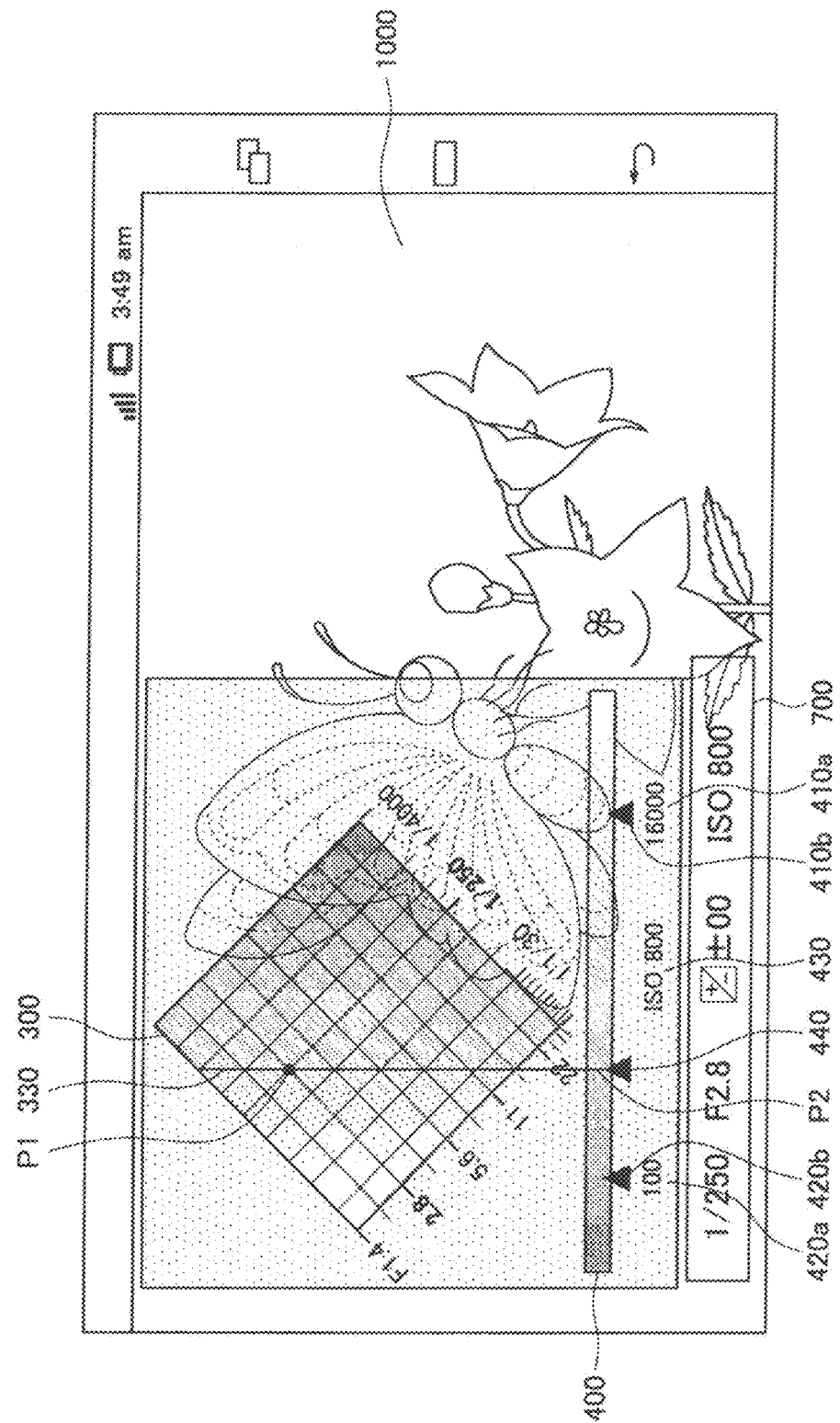
[Fig. 13]

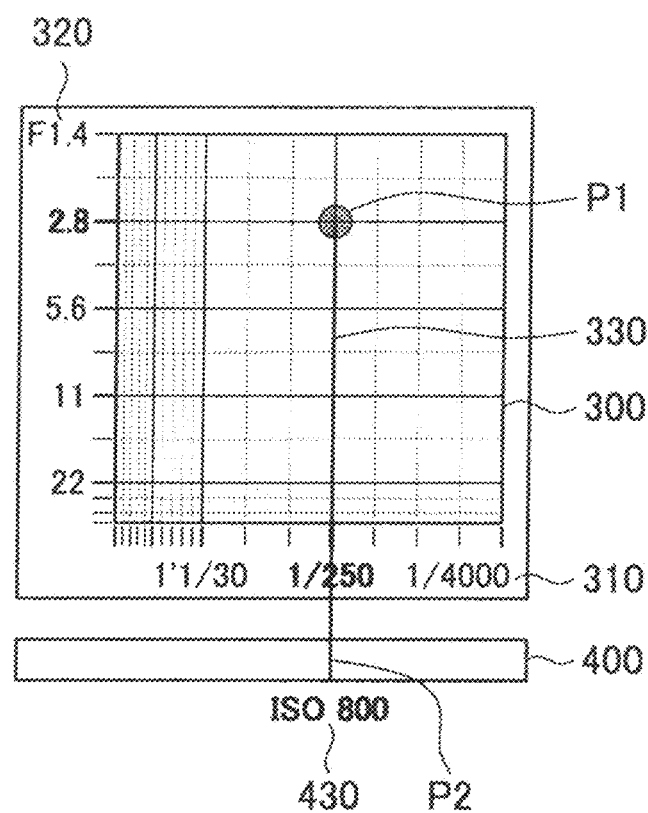
[Fig. 14]

[Fig. 15]
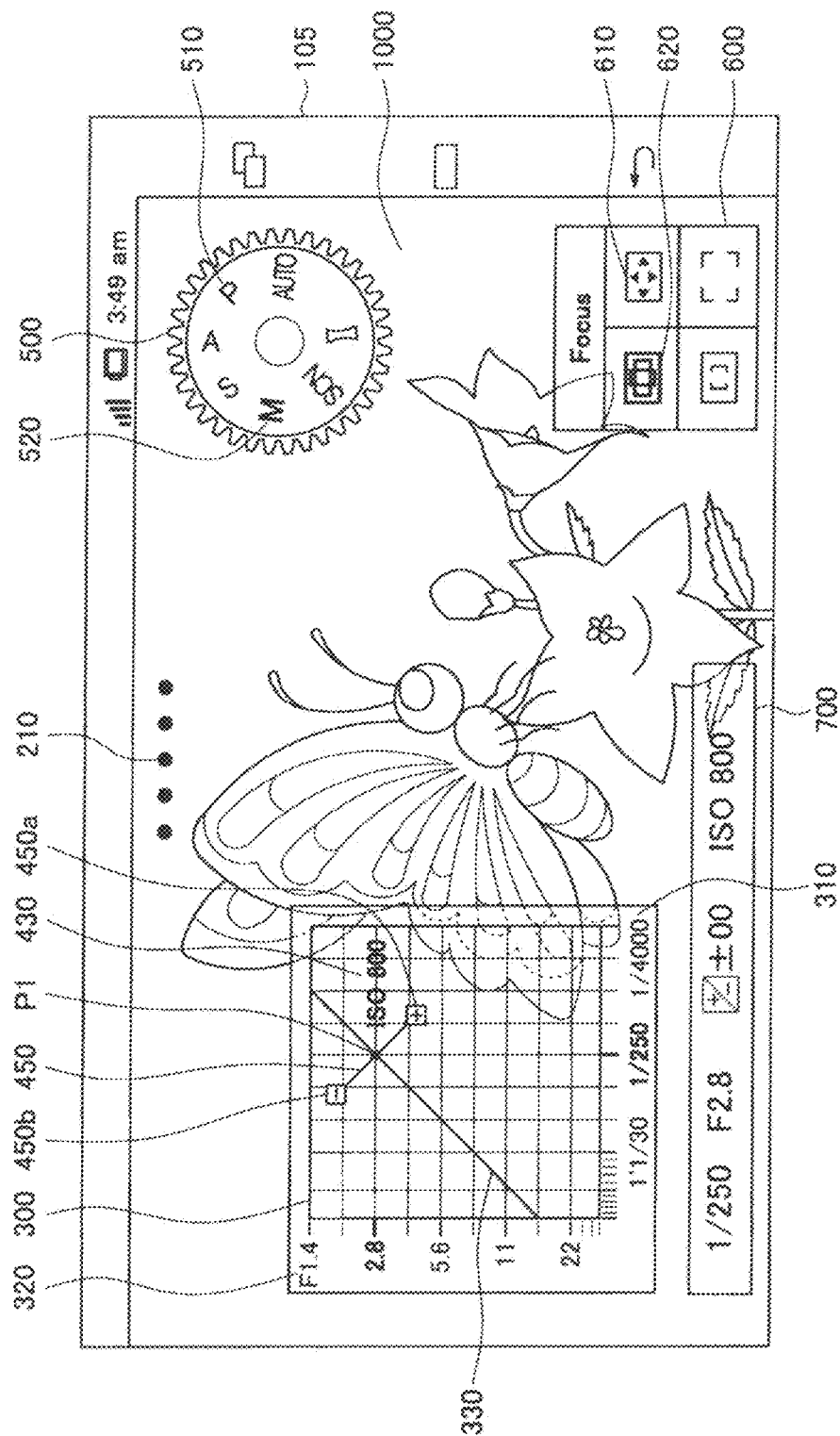

[Fig. 16]
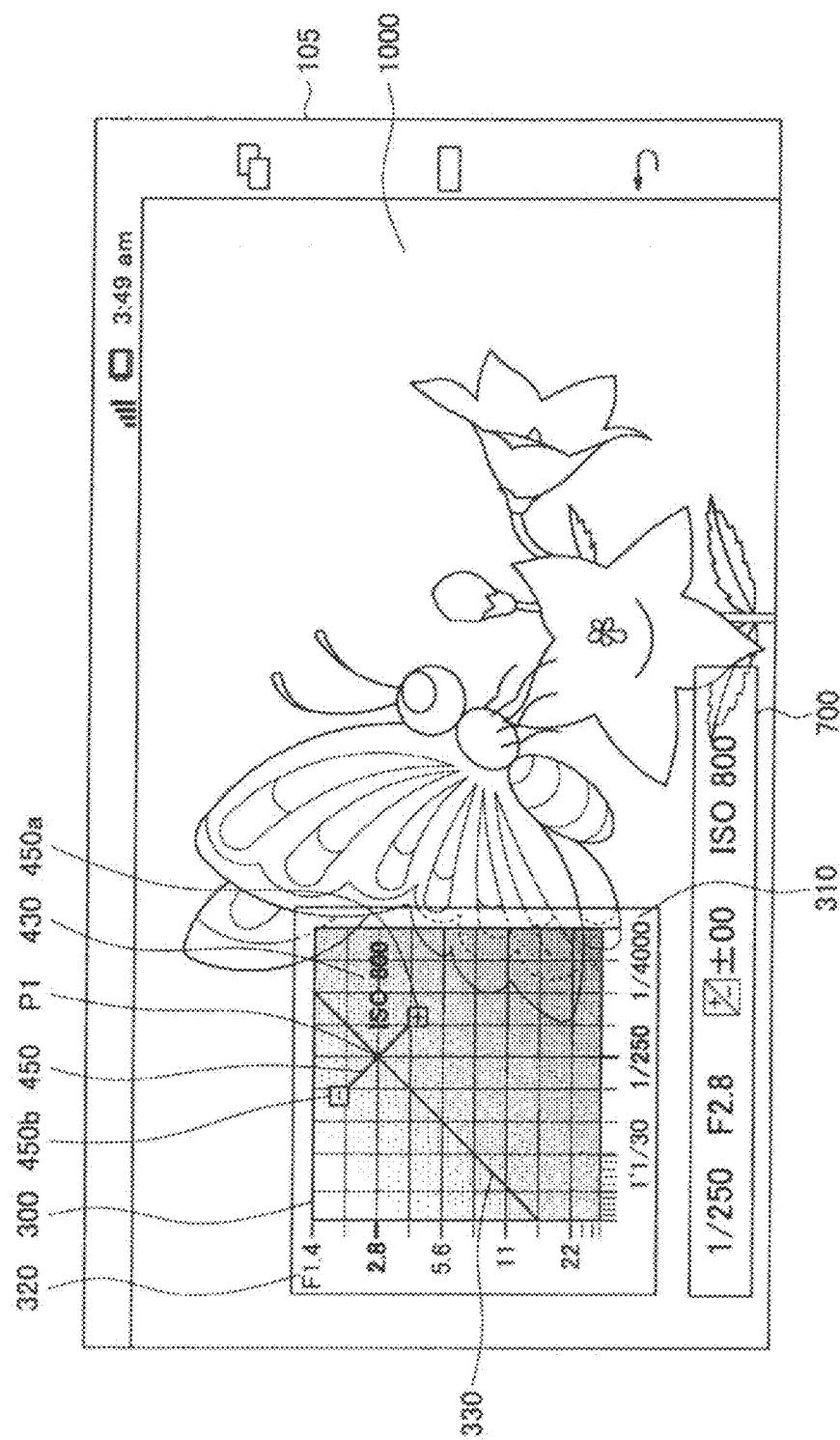

[Fig. 17]
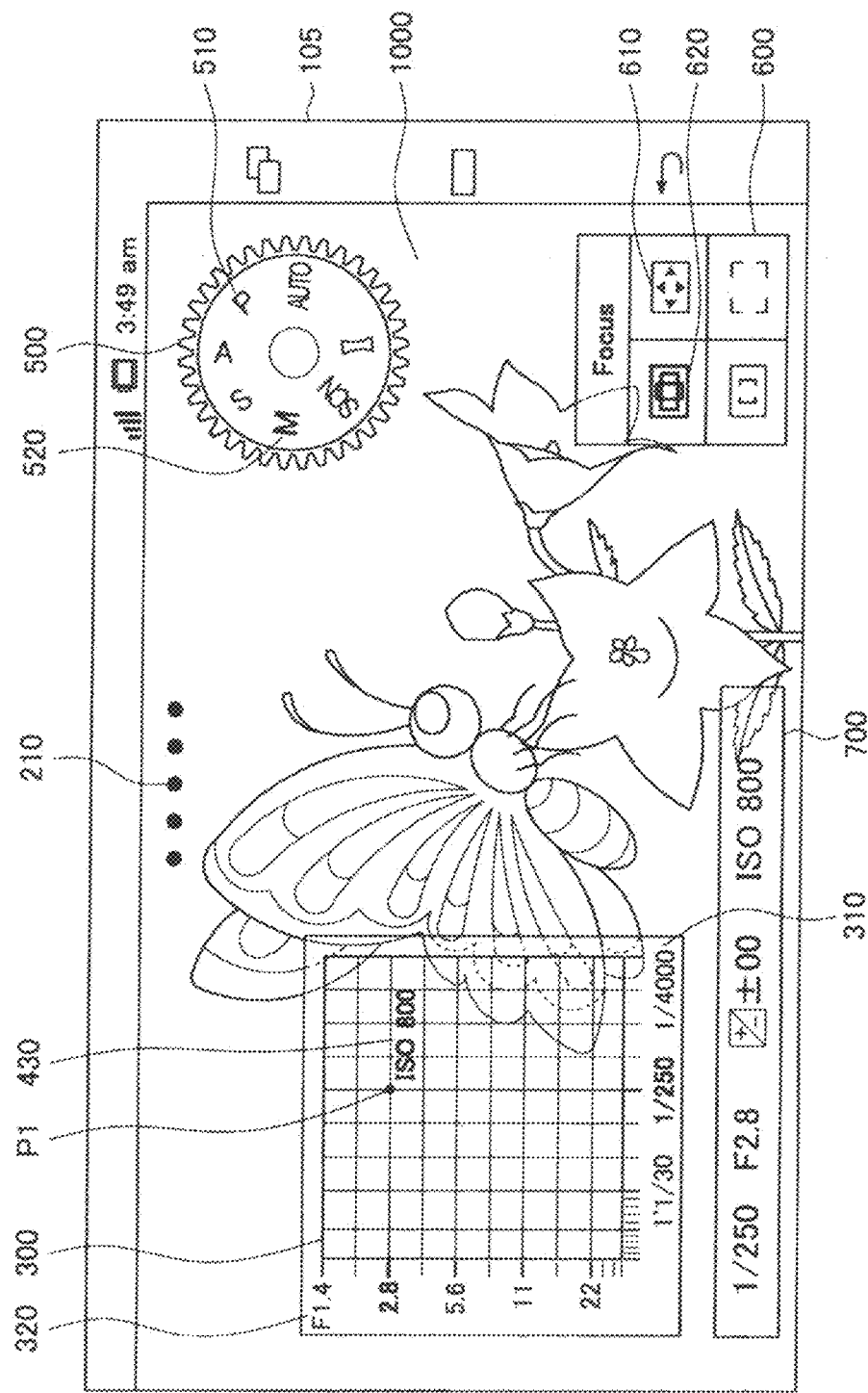

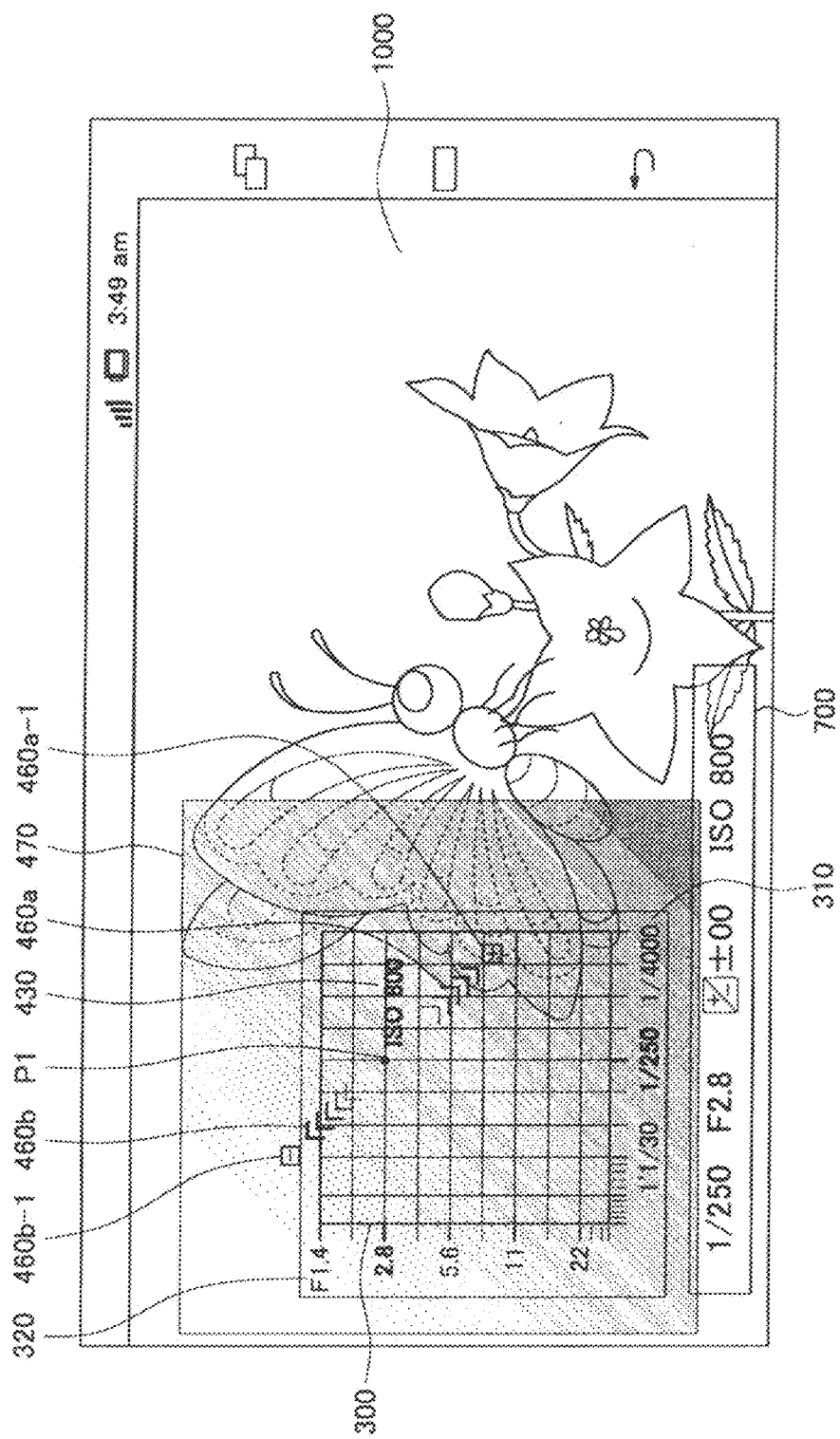
[Fig. 18]

[Fig. 19]
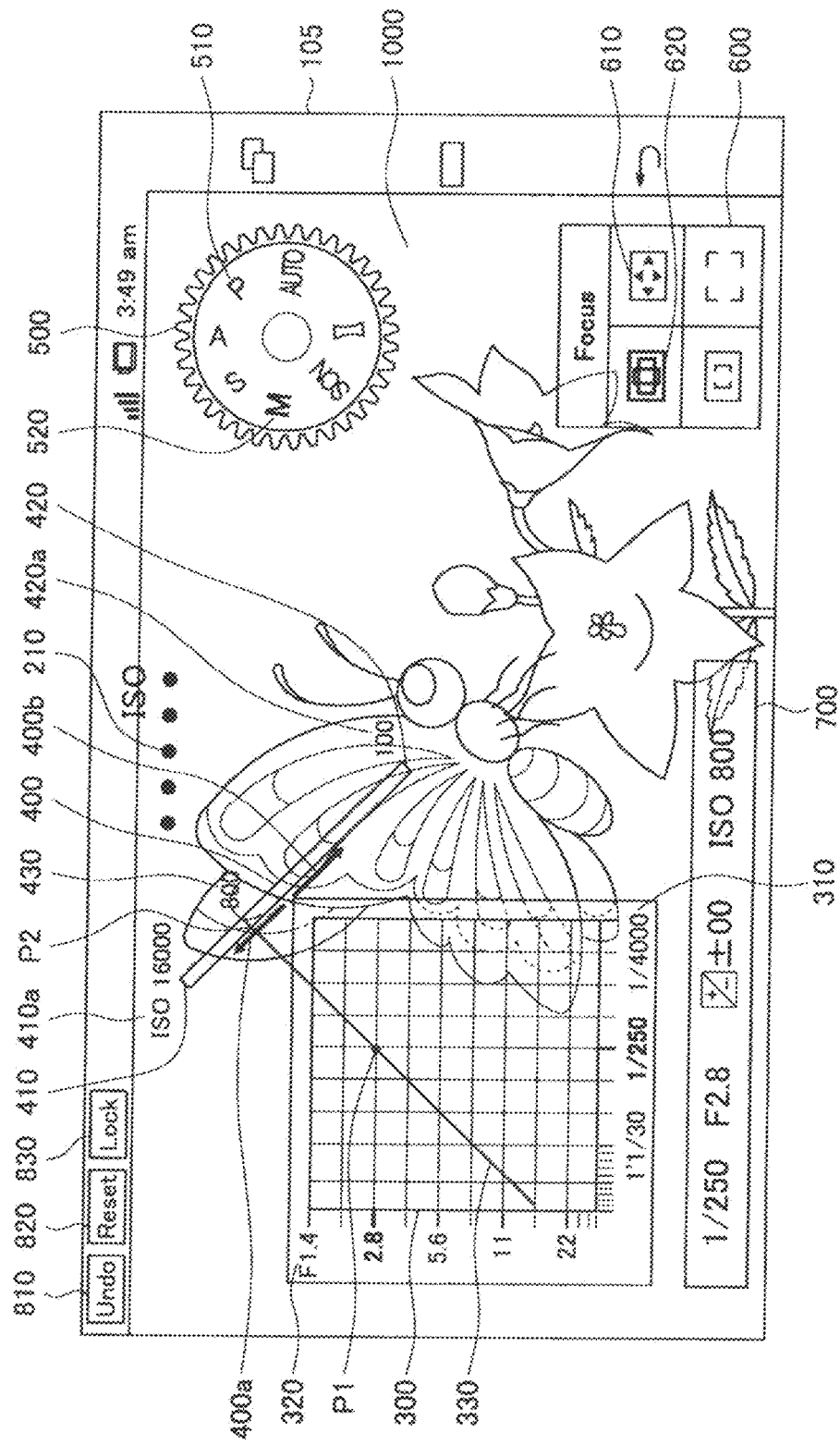

[Fig. 20]
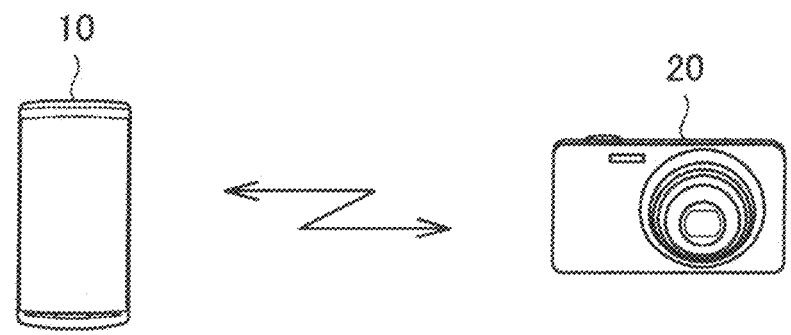
[Fig. 21]
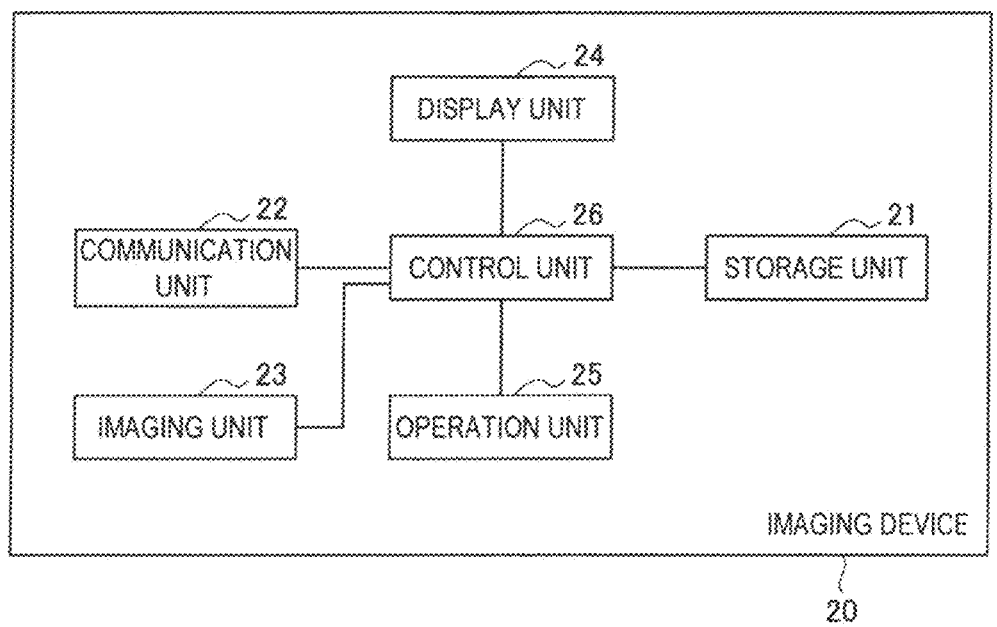

[Fig. 22]
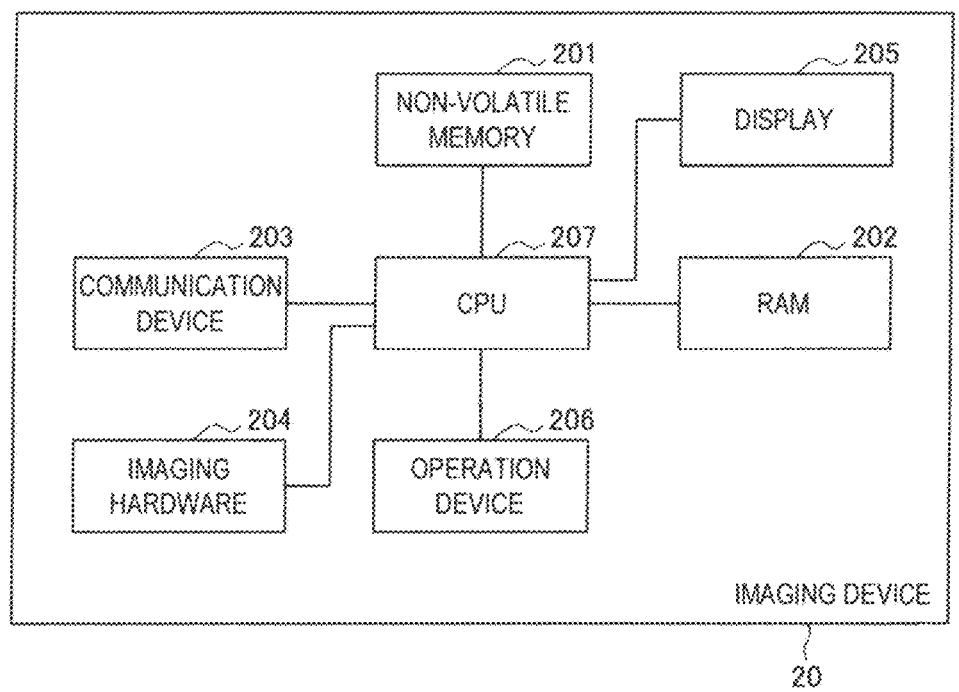

INFORMATION PROCESSING APPARATUS AND INFORMATION PROCESSING METHOD

CROSS REFERENCE TO RELATED APPLICATIONS

This application claims the benefit of Japanese Priority Patent Application JP 2013-231280 filed Nov. 7, 2013, the entire contents of which are incorporated herein by reference.

TECHNICAL FIELD

The present disclosure relates to an information processing apparatus, an information processing method, and a program.

BACKGROUND ART

PTL 1 discloses a technique that displays a graph for setting the shutter speed and aperture value.

CITATION LIST

Patent Literature

[PTL 1]
JP 2006-178015A

SUMMARY

Technical Problem

However, PTL 1 does not mention any measures to set a plurality of shooting parameters using a plurality of setting images.

On the other hand, when a user sets a plurality of shooting parameters using a plurality of setting images, it is desirable to allow the user to set intuitively these setting parameters.

Solution to Problem

A first exemplary illustration of the present disclosure includes an electronic apparatus. The electronic apparatus may include a processor and a memory having program code stored thereon. The program code may be such that, when it is executed by the processor, it causes the processor to perform various operations. The processor may control a display of a first parameter-setting image that relates to values of one or more parameters related to imaging, the first parameter-setting image comprising a graph and an indicator point that is movable by user input, where the values of the one or more parameters related to imaging are set based on a location of the indicator point in the graph; and display, in association with the first parameter-setting image, a second parameter-setting image that relates to values of at least one additional parameter related to imaging.

The first parameter-setting image may enable the user to set values of a first parameter related to imaging and a second parameter related to imaging based on the location of the indicator point in the graph; and the second parameter-setting image may enables the user to set values of a third parameter related to imaging.

At least a portion of the second parameter-setting image may be movable relative to the first parameter-setting image by user input and the value of the third parameter may be set based on a location of the portion of the second parameter-setting image relative to the first parameter-setting image.

The second parameter-setting image may be displayed in association with the first parameter-setting image by extending a reference line from the graph of the first parameter-setting image to contact the second parameter-setting image, the reference line passing through the indicator point.

The second parameter-setting image may comprise a bar image that is slidable by the user relative to the reference line.

The reference line may be such that each point thereof indicates a same amount of total exposure as the indicator point.

When the indicator point is moved by the user, the reference line may move with the indicator point and the second parameter-setting image may move so as maintain a same point of contact between the reference line and the second parameter-setting image.

The first parameter may be a shutter speed parameter and the second parameter may be an aperture parameter, and the graph of the first parameter-setting image may include a gradation that varies by position in the graph so as to indicate a relative exposures for the shutter speed and aperture parameter-settings corresponding to the respective position.

The third parameter may be an ISO parameter, and the second parameter-setting image may comprise a bar image that includes a gradation that varies by position in the bar image so as to indicate a relative exposure for the ISO setting corresponding to the respective position.

The second parameter-setting image may be displayed in association with the first parameter-setting image by displaying the second parameter-setting image within the graph of the first parameter-setting image next to the indicator point, and the second parameter-setting image may include increase and decrease buttons that, when selected, increase or decrease the value of the third parameter.

The processor may provide the user options to select from among a plurality of imaging modes, which may include first, second, and third imaging modes. When the first imaging mode is selected, the indicator point may be freely moved by the user within the graph to any available positions. When either of the second and third imaging modes is selected, the location of the indicator point may be restricted so as to maintain a predetermined exposure. When the second imaging mode is selected, the user may be allowed to move the indicator point only in a second parameter-changing direction, and in response to the indicator point being moved by the user in the second parameter-changing direction, the indicator point may be automatically moved in a first parameter-changing direction by an amount that maintains the predetermined exposure. When the third imaging mode is selected, the user may be allowed to move the indicator point only in a first parameter-changing direction, and in response to the indicator point being moved by the user in the first parameter-changing direction, the indicator point may be automatically moved in the second parameter-changing direction by an amount that maintains the predetermined exposure.

When the first imaging mode is selected the user may be able to freely move the indicator point within the graph by a tap operation or by a drag-and-drop operation. When the second imaging mode is selected, the first parameter-setting image may include a slider bar along a second parameter axis and the user may be able to move the indicator point only by moving the slider bar in the second parameter-changing direction. When the third imaging mode is selected, the first parameter-setting image may include a slider bar along a first parameter axis and the user may be able to move the indicator point only by moving the slider bar in the first parameter-changing direction.

The electronic apparatus may further include an imaging device that captures images based on the one or more parameters related to imaging and on the at least one additional parameter related to imaging.

The electronic apparatus may further include a display device. The processor may display, via the display device, the first and second parameter-setting images superimposed over a through-the-lens image captured by the imaging device.

As the values of any of the one or more parameters related to imaging and/or the at least one additional parameter related to imaging are changed by way of the first and second parameter-setting images, the through-the-lens image that is displayed may be updated in real time to reflect the changing values of the parameters.

The electronic apparatus may further include a communications unit configured to communicate with a separated device that is paired to the electronic apparatus. The processor may display the first and second parameter-setting images by communicating the first and second parameter-setting images to the paired device with instructions to display the images thereon.

The value of the third parameter may set based on a location of the second parameter-setting image relative to the first parameter-setting image.

Advantageous Effects of Invention

According to one or more of embodiments of the present disclosure described above, the user, when setting a plurality of shooting parameters using a plurality of setting images, can intuitively grasp the relevance of these shooting parameters to each other, and eventually, the user can intuitively set these shooting parameters. Note that advantages of the technology according to the present disclosure are not limited to those described herein. The technology according to the present disclosure may have any technical advantage described herein and other technical advantages that are apparent from the present specification.

BRIEF DESCRIPTION OF DRAWINGS

FIG. 1 is a block diagram illustrating the configuration of an information processing apparatus according to a first embodiment of the present disclosure.

FIG. 2 is a hardware configuration diagram of the information processing apparatus according to the first embodiment.

FIG. 3 is a flow chart illustrating the process procedure of the information processing apparatus.

FIG. 4 is a diagram for describing an exemplary display of the information processing apparatus.

FIG. 5 is a diagram for describing an exemplary display of the information processing apparatus.

FIG. 6 is a diagram for describing an exemplary display of the information processing apparatus.

FIG. 7 is a diagram for describing an exemplary display of the information processing apparatus.

FIG. 8 is a diagram for describing an exemplary display of the information processing apparatus.

FIG. 9 is a diagram for describing an exemplary display of the information processing apparatus.

FIG. 10 is a diagram for describing an exemplary display of the information processing apparatus.

FIG. 11 is a diagram for describing an exemplary display of the information processing apparatus.

FIG. 12 is a diagram for describing an exemplary display of the information processing apparatus.

FIG. 13 is a diagram for describing an exemplary display of the information processing apparatus.

FIG. 14 is a diagram for describing an exemplary display of the information processing apparatus.

FIG. 15 is a diagram for describing an exemplary display of the information processing apparatus.

FIG. 16 is a diagram for describing an exemplary display of the information processing apparatus.

FIG. 17 is a diagram for describing an exemplary display of the information processing apparatus.

FIG. 18 is a diagram for describing an exemplary display of the information processing apparatus.

FIG. 19 is a diagram for describing an exemplary display of the information processing apparatus.

FIG. 20 is a block diagram illustrating the configuration of an information processing system according to a second embodiment of the present disclosure.

FIG. 21 is a block diagram illustrating the configuration of an imaging device according to the second embodiment.

FIG. 22 is a hardware configuration diagram of the imaging device.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. First embodiment (example of Information Processing Apparatus performing both imaging and displaying)
1-1. Overview of Process of Information Processing Apparatus
1-2. Configuration of Information Processing Apparatus
1-3. Process of Information Processing Apparatus
1-4. Various Exemplary Displays
2. Second Embodiment (example of an information processing apparatus performing displaying and an imaging device performing imaging)
2-1. Overall Configuration of Information Processing System
2-2. Configuration of Imaging Device
2-3. Process Procedure of Information Processing System 1. First Embodiment 1-1. Overview of Process of Information Processing Apparatus An information processing apparatus 10 according to the first embodiment generally displays a first setting image and a second setting image in association with each other. The first setting image is used to set a first shooting parameter related to imaging, and the second setting image is used to set a second shooting parameter related to imaging.

The first shooting parameter includes, for example, a shutter speed (Tv) and an aperture value (Av). The first setting image is, for example, an x-y plane image (Tv/Av plane image) used to collectively set the shutter speed (Tv) and aperture value (Av). The x-axis (horizontal axis) represents, for example, Tv, and the y-axis (vertical axis) represents, for example, Av. The user specifies a point in the Tv/Av plane image and thus can set a combination of Tv value and Av value (Tv/Av value).

The second shooting parameter includes, for example, an ISO value. The second setting image is a bar image (ISO bar image) used to set an ISO value. Each point in the ISO bar image corresponds to a value of ISO, and the user can set an ISO value by matching a point on the ISO bar image to a predetermined reference line.

The information processing apparatus 10 also displays the first and second setting images in association with each other. For example, the information processing apparatus 10 extends the above-described reference line from a Tv/Av plane image. Then, the information processing apparatus 10 causes the ISO bar image to intersect the reference line. More specifically, the information processing apparatus 10 causes a portion corresponding to an optimum value (or initial value) of ISO values in the ISO bar image to intersect the reference line.

The first and second shooting parameters are not limited to the above example, and they can be any parameter related to imaging. That is, in the present embodiment, any parameter can be employed as long as the plurality of shooting parameters can be set using a plurality of setting images. An example of shooting parameters other than the above example includes, for example, a combination of RGB (red, green, and blue) and a combination of saturation, brightness, and contrast (or, for example, sharpness and luminance).

In the former case, for example, the first shooting parameter is set to RG, and the first setting image is set to RG plane image (that is, a color space) used to collectively set RG. The second shooting parameter is set to B, and the second setting image is set to a B bar image used to set B. The contents of the RG plane image and the B bar image may be similar to those of the Tv/Av plane image and ISO bar image.

In the latter case, for example, the first shooting parameter is set to saturation and brightness, and the first setting image is set to an x-y plane image (the saturation/brightness plane image) used to collectively set saturation and brightness. The second shooting parameter is set to contrast, and the second setting image is set to a contrast bar image for setting contrast. The contents of a saturation/brightness plane image and a contrast bar image may be similar to those of the Tv/Av plane image and ISO bar image, respectively.

In the combination of RGB and the combination of luminance, brightness, and contrast, the master-slave relationship between parameters is not particularly limited. For example, RB may be set as the first shooting parameter. In addition, in the above example, there may be a plurality of first shooting parameters, but there may be only one of first shooting parameter. In this case, the first setting image may be similar to each bar image. In the following description, the first shooting parameter is set to Tv and Av, and the second shooting parameter is set to an ISO value.

1-2. Configuration of Information Processing Apparatus

The configuration of the information processing apparatus 10 according to the present embodiment is now described with reference to FIGS. 1 and 2.

As shown in FIG. 1, the information processing apparatus 10 is configured to include a storage unit 11, a communication unit 12, an imaging unit 13, a display unit 14, an operation unit (input operation unit) 15, and a control unit 16. The storage unit 11 stores a program which causes the information processing apparatus 10 to execute functions of the storage unit 11, the communication unit 12, the imaging unit 13, the display unit 14, the operation unit 15, and the control unit 16. The storage unit 11 also stores various types of image information (for example, Tv/Av plane image and ISO bar image).

The communication unit 12 communicates with other information processing apparatus. The imaging unit 13 captures an image. Specifically, the imaging unit 13 outputs an image captured by an image sensor to the control unit 16 as a through-the-lens image until the user performs a shooting operation (for example, an operation of depressing a shutter button that is not shown). When the user performs a shooting operation, the imaging unit 13 performs an imaging (specifically, performs an action such as releasing a shutter) corresponding to a setting value of Tv/Av and ISO values. Then, the imaging unit 13 outputs the image captured by the image sensor to the control unit 16 as a captured image.

The display unit 14 displays various types of images, for example, a Tv/Av plane image, an ISO bar image, and a captured image. The operation unit 15 may be a touch panel and is disposed on a surface of the display unit 14. The operation unit 15 allows the user to perform various input operations, for example, an input operation for setting Tv, Av, and ISO values. The operation unit 15 outputs operation information related to an input operation performed by the user to the control unit 16. The control unit 16 controls the entire information processing apparatus 10 and, in particular, the control unit 16 performs control of displaying a Tv/Av plane image and an ISO bar image in association with each other and sets a Tv/Av value and ISO value.

The information processing apparatus 10 has the hardware configuration shown in FIG. 2, and such hardware configuration allows the storage unit 11, the communication unit 12, the imaging unit 13, the display unit 14, the operation unit 15, and the control unit 16 to be implemented.

In other words, the information processing apparatus 10 is configured to include a non-volatile memory 101, a RAM 102, a communication device 103, an imaging device 104, a display 105, a touch panel 106, and a CPU 107, as its hardware configuration.

The non-volatile memory 101 stores, for example, various programs and image information. The program stored in the non-volatile memory includes a program which causes the information processing apparatus 10 to execute functions of the storage unit 11, the communication unit 12, the imaging unit 13, the display unit 14, the operation unit 15, and the control unit 16.

The RAM 102 is used as a work area of the CPU 107. The communication device 103 communicates with other information processing apparatus. The imaging device 104 captures an image and generates a captured image. The display 105 displays various types of image information. The display 105 may output audio information. The touch panel 106 accepts various input operations performed by the user.

The CPU 107 reads out and executes the program stored in the non-volatile memory 101. Thus, the CPU 107, which reads out and executes the program stored in the non-volatile memory 101, allows the information processing apparatus 10 to execute functions of the storage unit 11, the communication unit 12, the imaging unit 13, the display unit 14, the operation unit 15, and the control unit 16. In other words, the CPU 107 functions as a component for practically operating the information processing apparatus 10.

The information processing apparatus 10 may be a smartphone, smart tablet, or other smart device, but information processing apparatus 10 is not particularly limited as long as it satisfies the above requirements. For example, the information processing apparatus 10 may be an imaging device having the above configuration. However, a smartphone or smart tablet is more preferable because it often has a display screen larger in size than that of the imaging device. In addition, a specific example of the operation unit 15 is a touch panel, but other operation devices may be used. In other words, the operation unit 15 is not particularly limited as long as it can operate a Tv/Av plane image and an ISO bar image, and operation unit 15 may be a hard key such as a cross key and a dial. However, it is preferable to use a touch panel as a specific example of the operation unit 15. In addition, if an operation is performed in combination with a hard key, it is necessary for the user to capture an image while checking the hard key, and thus the shooting operation may be interrupted. For example, it may be necessary for the user to check separately the operation of a hard key and the display of the display unit 14.

1-3. Process Procedure of Information Processing Apparatus

The process procedure performed by the information processing apparatus 10 is now described with reference to the flow chart shown in FIG. 3.

In step S10, the imaging unit 13 performs imaging and outputs a captured image that is obtained by such imaging to the control unit 16. The control unit 16 causes the display unit 14 to display the captured image as a through-the-lens image.

In step S20, the control unit 16 displays a Tv/Av plane image and an ISO bar image, which are superimposed on a through-the-lens image. The control unit 16 may display another image, which is superimposed on a through-the-lens image. The control unit 16 can transparently display an image to be superimposed on a through-the-lens image.

In step S30, the control unit 16 performs control of displaying a Tv/Av image and an ISO image depending on an input operation and sets a Tv/Av value and an ISO value. Thereafter, the information processing apparatus 10 ends the process.

1-4. Exemplary Displays

1-4-1. First Display Example

A first display example of the information processing apparatus 10 is now described with reference to FIG. 4. In the display example of FIG. 4, a shooting mode is set to a manual mode (M). The manual mode is a mode that enables the user to optionally select a Tv/Av value.

As shown in FIG. 4, the control unit 16 displays a through-the-lens image 1000, a display layer indicator 210, a Tv/Av plane image 300, an ISO bar image 400, a dial image 500, a focus mode selection image 600, and a shooting parameter display image 700. Among these images, the display layer indicator 210, the dial image 500, the focus mode selection image 600, and the shooting parameter display image 700 can be omitted. In addition, the control unit 16 may erase the display layer indicator 210, the dial image 500, the focus mode selection image 600, and the shooting parameter display image 700 when the user is operating the Tv/Av plane image 300 or the ISO bar image 400. The shooting parameter display image 700 may be displayed even when the user is operating the Tv/Av plane image 300 or the ISO bar image 400.

The control unit 16 may create a plurality of display layers that include an image (the Tv/Av plane image 300, the ISO bar image 400, the dial image 500, the focus mode selection image 600, and the shooting parameter display image 700 in the example of FIG. 4) to be superimposed on the through-the-lens image 1000. The control unit 16, when creating a plurality of display layers, displays the display layer indicator 210 that indicates a display layer currently displayed. When the user performs a display layer switching operation (for example, a finger flick operation in the left and right direction in FIG. 4), the control unit 16 switches the current display layer to a display layer to be displayed.

The dial image 500 has a plurality of shooting mode symbols 510, which indicate a shooting mode, marked in the circumferential direction, and a shooting mode symbol 520 at the left end of these shooting mode symbols 510 is highlighted. The shooting mode symbol 520 indicates a shooting mode that is currently set. In other words, the control unit 16 rotates the dial image 500 depending on an input operation performed by the user and highlights the shooting mode symbol 520 marked at the left end of the dial image 500. The control unit 16 then sets the current shooting mode as a shooting mode indicated by the shooting mode symbol 520. The input operation for rotating the dial image 500 may be performed, for example, by tapping the dial image 500 with the finger, and in this state, by moving the finger in the circumferential direction. In the example of FIG. 4, a manual mode (M) is selected.

The focus mode selection image 600 has a plurality of focus mode symbols 610 marked in the focus mode selection image 600, and any one focus mode symbol 620 of these focus mode symbols 610 is highlighted. The focus mode symbol 620 indicates a focus mode that is currently selected. For example, when the user taps any one of the focus mode symbols 610, the control unit 16 highlights the focus mode symbol 610 tapped by the user and shifts to a focus mode corresponding to the focus mode symbol 610. The shooting parameter display image 700 indicates a shooting parameter (for example, Tv/Av or ISO value) that is currently set.

The Tv/Av plane image 300 is a plane image in which the horizontal axis 310 represents Tv and the vertical axis 320 represents Av. When the user taps any one point on the Tv/Av plane image 300, the control unit 16 displays a point P1 on the tapped point. Furthermore, the control unit 16 sets a Tv/Av value as the Tv/Av value indicated by the point P1 and highlights the Tv/Av value indicated by the point P1 on the horizontal axis 310 and the vertical axis 320. In the example of FIG. 4, the Tv value is set to $\frac{1}{250}$ and the Av value is set to 2.8. The current shooting mode is set to the manual mode, and thus the control unit 16 provides no limitation on the Tv/Av value. Thus, the user can select (set) the Tv/Av value by tapping any point on the Tv/Av plane image 300.

Furthermore, the control unit 16 displays a reference line 330 passing through the point P on the Tv/Av plane image 300. The Tv/Av value indicated by each point on the reference line 330 indicates the same amount of light exposure as that of the point P1. The reference line 330 is extended to the outside through the upper right end of the Tv/Av plane image 300.

If the user taps a point other than the point P1 during display of the point P1, then the control unit 16 moves the point P1 to the point tapped by the user. Then, the control unit 16 sets the Tv/Av value to a Tv/Av value indicated by the moved point P1. Furthermore, the control unit 16 causes the reference line 330 to follow the point P1 newly set.

Note that a way for the user to select (set) a Tv/Av value is not limited to the way of tapping a point on a Tv/Av plane image and is not particularly limited as long as a point on the Tv/Av plane image 300 can be selected. For example, the user may select a point on the Tv/Av plane image 300 using a drag-and-drop operation. For example, when the user drags the point P1, the control unit 16 causes the point P1 to follow the finger of the user, and when the user drops the point P1, the control unit 16 displays the point P1 at the position. The control unit 16 may accept the operation of a combination of the tap operation and the drag-and-drop operation. Then, the control unit 16 may set a Tv/Av value to the Tv/Av value indicated by the moved point P1.

The ISO bar image 400 is a bar image used to select an ISO value. In the ISO bar image 400, each point in the longitudinal direction indicates an ISO value, a point 410 at the upper end indicates the maximum value of the ISO value, and a point 420 at the lower end indicates the minimum value of the ISO value. In the example of FIG. 4, the maximum value is set to 16000 and the minimum value is set to 100, but the maximum and minimum values are not limited to these examples. The control unit 16 displays a maximum value display image 410a near the point 410 at the upper end of the ISO bar image 400 and displays a minimum value display image 420a near the point 420 at the lower end of the ISO bar image 400.

The control unit 16 displays the ISO bar image 400 in association with the Tv/Av plane image 300. Specifically, the control unit 16 displays the ISO bar image 400 at a position intersecting the reference line 330. More specifically, the control unit 16 sets the ISO value indicated by a point P2 at which the ISO bar image 400 intersects the reference line 330 as a setting value of the ISO value. In other words, the control unit 16 causes the point P2 in the ISO bar image 400 corresponding to the setting value of the ISO value to intersect the reference line 330. In addition, the control unit 16 displays a setting value display image 430 indicating the setting value of the ISO value near the point P2.

Moreover, the control unit 16 moves the ISO bar image 400 in the direction of an arrow 400a or 400b depending on an input operation performed by the user. The input operation includes, for example, a way of tapping the ISO bar image 400 with the finger and dragging the finger in the direction of the arrow 400a or 400b. This also changes the setting value indicated by the point P2, and thus the control unit 16 sets (changes) an ISO value to the setting value indicated by the point P2.

When the reference line 330 is moved, the control unit 16 causes the ISO bar image 400 to follow the reference line 330. In this case, the control unit 16 may maintain the ISO value at the current value and may change the ISO value to the optimum value (or a predetermined initial value) that corresponds to the changed Tv/Av value. The "optimum value" in the present embodiment refers to a value that is determined as being optimal by the control unit 16. In the former case, the control unit 16 adjusts the position of the ISO bar image 400 to maintain the ISO value. In other words, the position of the point P2 in the ISO bar image 400 before and after moving the reference line 330 is remained unchanged. In the latter case, the control unit 16 calculates an optimum value of the ISO value corresponding to the Tv/Av value and sets the ISO value as the calculated optimum value (or sets the ISO value as a predetermined initial value). Moreover, the control unit 16 adjusts the position of the ISO bar image 400 so that the point P2 indicates an optimum value (or initial value).

The control unit 16 calculates an optimum value of the Tv/Av value and ISO value and adjusts the positions of the point P1, the reference line 330, and the ISO bar image 400 based on the calculated optimum value, in the initial state, that is, in the state where the images shown in FIG. 4 begin to be displayed.

A setting image for setting the ISO value (a second setting image) is not limited to a bar image. For example, the second setting image may be a dial-shaped image. Such a dial image has an ISO value marked in the circumferential direction thereof as with the dial image 500. The control unit 16 causes any one of ISO values on the dial image to intersect the reference line 330. The control unit 16 sets the ISO value intersecting the reference line 330 as a setting value.

Furthermore, the control unit 16 may cause the through-the-lens image 1000 to be changed depending on the current Tv/Av value and ISO value. For example, the control unit 16 may perform a process such as blurring and panning on the through-the-lens image 1000 depending on the current Tv/Av value and ISO value. In this case, the user can easily grasp how the through-the-lens image 1000 changes depending on the current Tv/Av value and ISO value.

The control unit 16 also may reset the setting value of the Tv/Av value and ISO value for every shooting operation, or may remain the setting value unchanged.

When the shooting mode is set to the auto mode (the mode in which Tv/Av value and ISO value are set automatically), the control unit 16 also may perform the following processes. In other words, each time when the user performs a preliminary operation of the shooting operation (for example, operation of depressing a shooting button halfway), the control unit 16 may calculate an optimum value of the Tv/Av value and ISO value and may change dynamically the positions of the point P1, the reference line 330, and the ISO bar image 400 based on the calculated optimum value. This makes it possible for the user to easily grasp, for example, how the Tv/Av value and ISO value are changed for every shooting scene. Thus, for example, novice users or advanced amateur users can know the mechanism of an imaging device using a graphical representation. Accordingly, novice users and advanced amateur users are interested in the Tv/Av value and ISO value, and eventually, it is expected that they become more motivated to change these shooting parameters by their own desire.

According to the first display example, the display unit 14 displays the Tv/Av plane image 300 and the ISO bar image 400 in association with each other, and thus the user can intuitively grasp the relevance of these shooting parameters to each other. Accordingly, the user can intuitively set these shooting parameters. The user may set the Tv/Av value before the ISO value, or may set the ISO value before the Tv/Av value.

Furthermore, the user can set the Tv/Av value and ISO value using only two steps, the step of tapping (or drags and drops) the Tv/Av planet image 300 and the step of moving the ISO bar image 400. Thus, the user can easily set these shooting parameters. Moreover, the control unit 16 changes the Tv/Av plane image 300 and the ISO bar image 400 depending on an input operation performed by the user (for example, to move the point P1 and the reference line 330 and to move the ISO bar image 400). Thus, the user can set these shooting parameters in a graphical and dynamic (flexible) manner.

A veteran user can view each of shooting parameters with his eyes and comprehend it before shooting. A novice user can easily grasp how each shooting parameter changes depending on the input operation. Accordingly, it is expected that a novice user becomes much more interested in setting of each shooting parameter.

Furthermore, the information processing apparatus 10 can provide an interface that allows the user of the existing imaging device to perform an input operation more efficiently. On the other hand, the information processing apparatus 10 allows the user who feels any difficulty in using an imaging device like users of a smartphone, smart tablet, or other smart device to be more accessible. In addition, the applicability of display modes in the information processing apparatus 10 to the imaging device makes it possible to diversify the product form of the imaging device and meet the needs of an increasing number of users.

The inventors have also studied the technique that sets each shooting parameter with only a hard key (for example, any combination of dial, button, cross key, or the like). However, in this technique, the setting of one shooting parameter may often necessitate a multi-step process. In addition, it is also difficult for the user to know the relevance of shooting parameters to each other. The usability depends on the number and installation position of hard keys. If the number of hard keys is small, a case of combining these hard keys increases, resulting in a more complicated operation.

1-4-2. Second Display Example

A second display example is now described with reference to FIG. 5. The second display example is made by assigning the gradation of light and shade to the Tv/Av plane image 300 and the ISO bar image 400 of the first display example. FIG. 5 illustrates the gradation of light and shade using shading. As the hatching is lighter, the color is brighter.

The gradation of light and shade of the Tv/Av plane image 300 indicates the amount of light exposure that is determined by the Tv/Av value. As a point on the Tv/Av plane image 300 is brighter, the amount of light exposure indicated by the point is larger. The gradation of light and shade of the ISO bar image 400 indicates an ISO value. As a point of the ISO bar image 400 is brighter, the ISO value indicated by the point is larger. The gradation of light and shade may be assigned to only one of the Tv/Av plane image 300 and the ISO bar image 400. In addition, the gradation of light and shade of the Tv/Av plane image 300 may indicate only a case where the user performs setting of a Tv/Av value. Similarly, the gradation of light and shade of the ISO bar image 400 may indicate only a case where the user performs setting of an ISO value. As a result, the user may not perform setting of the Tv/Av value and the ISO value, and thus it is possible for the user to concentrate on a subject to be captured.

In the second display example, the control unit 16 displays a shooting button 800 in addition to the Tv/Av plane image 300 and the ISO bar image 400. When the shooting button 800 is tapped, the imaging unit 13 captures an image. The shooting button 800 may be omitted.

According to the second display example, the user can grasp more intuitively the amount of light exposure and ISO value by referring to the gradient direction of the gradation of light and shade. Furthermore, the user can easily grasp the operation direction for increasing or decreasing the amount of light exposure and ISO value by referring to the gradient direction of the gradation of light and shade.

1-4-3. Third Display Example

A third display example is now described with reference to FIG. 6. The third display example is displayed when the user selects an A mode (aperture priority mode) as a shooting mode. Even in the third display example, the control unit 16 displays the Tv/Av plane image 300 and the ISO bar image 400, but the third display example is different from the first display example in the following points.

In this mode, the control unit 16 displays a slider bar image 340 near the Tv/Av plane image 300, more specifically, near the vertical axis 320. In this mode, the control unit 16 does not accept a user's tap operation (or drag-and-drop operation) on the Tv/Av plane image 300, but instead, the control unit 16 accepts an operation on the slider bar image 340.

In other words, the control unit 16 moves the slider bar image 340 in the direction of an arrow 340a or 340b depending on an input operation performed by the user. The input operation includes, for example, a way of tapping the slider bar image 340 with the finger and dragging the finger in the direction of the arrow 340a or 340b. The control unit 16 sets Av to a value corresponding to the position of the slider bar image 340 and further calculates an optimum Tv value corresponding to a setting value of Av. The control unit 16 then sets Tv to the calculated optimum value and moves the point P1 to the position corresponding to the setting value of Tv/Av. In addition, the control unit 16 displays the reference line 330. In this case, the Tv/Av value indicated by each point on the reference line 330 indicates the same amount of light exposure as that of the point P1.

Thus, the reference line 330 is fixed as a graph indicating an optimum value of the amount of light exposure, and the point P1 is moved in the direction of the arrow 340a or 340b and in the direction of an arrow 310a or 310b on the reference line 330. The control unit 16 controls the ISO bar image 400 in a similar way to that of the first display example. Thus, the user can set Av and an ISO value in a dynamic and graphical manner. Moreover, the user can grasp how Tv changes with the change of Av in a dynamic and graphical manner.

1-4-4. Fourth Display Example

A fourth display example is now described with reference to FIG. 7. The fourth display example is displayed when the user selects an S mode (shutter speed priority mode) as a shooting mode. Even in the fourth display example, the control unit 16 displays the Tv/Av plane image 300 and the ISO bar image 400, but the fourth display example is different from the first display example in the following points.

In this mode, the control unit 16 displays a slider bar image 350 near the Tv/Av plane image 300, more specifically, near the horizontal axis 310. In this mode, the control unit 16 does not accept a user's tap operation (or drag-and-drop operation) on the Tv/Av plane image 300, but instead, the control unit 16 accepts an operation on the slider bar image 350.

In other words, the control unit 16 moves the slider bar image 350 in the direction of an arrow 350a or 350b depending on an input operation performed by the user. The input operation includes, for example, a way of tapping the slider bar image 350 with the finger and dragging the finger in the direction of the arrow 350a or 350b. The control unit 16 sets Tv to a value corresponding to the position of the slider bar image 350 and further calculates an optimum Av value corresponding to a setting value of Tv. The control unit 16 then sets Av to the calculated optimum value and moves the point P1 to the position corresponding to the setting value of Tv/Av. In addition, the control unit 16 displays the reference line 330. In this case, the Tv/Av value indicated by each point on the reference line 330 indicates the same amount of light exposure as that of the point P1.

Thus, the reference line 330 is fixed as a graph indicating an optimum value of the amount of light exposure, and the point P1 is moved in the direction of the arrow 350a or 350b and in the direction of an arrow 320a or 320b on the reference line 330. The control unit 16 controls the ISO bar image 400 in a similar way to that of the first display example. Thus, the user can set Tv and an ISO value in a dynamic and graphical manner. Moreover, the user can grasp how Av changes with the change of Tv in a dynamic and graphical manner.

1-4-5. Fifth Display Example

A fifth display example is now described with reference to FIG. 8. The fifth display example is displayed when the user selects a P mode (program mode) as a shooting mode. Even in the fifth display example, the control unit 16 displays the Tv/Av plane image 300 and the ISO bar image 400, but the fifth display example is different from the first display example in the following points.

In this mode, the control unit 16 calculates an optimum value of Tv/Av value and sets a Tv/Av value to the calculated optimum value. Then, the control unit 16 moves the point P1 to the position corresponding to a setting value of Tv/Av. In addition, the control unit 16 displays the reference line 330. In this case, the Tv/Av value indicated by each point on the reference line 330 indicates the same amount of light exposure as that of the point P1. The control unit 16 fixes the reference line 330. Then, the control unit 16 accepts an input operation of tapping (or drag-and-drop operation) on the reference line 330 and moves the point P1 on the reference line 330 depending on the accepted input operation. In other words, the control unit 16 moves the point P1 in the direction of an arrow 330a or 330b. Then, the control unit 16 changes a setting value of the Tv/Av value to the Tv/Av value indicated by the moved point P1.

When an operation of tapping (or a drag-and-drop operation) a region other than the reference line 330 in the Tv/Av plane image 300 is performed, the control unit 16 may move the point P on the reference line 330 depending on the input operation. For example, when the user drags the finger in the direction parallel to the reference line 330 in a region other than the reference line 330, the control unit 16 may move the point P1 in the direction of movement of the finger.

The control unit 16 controls the ISO bar image 400 in a similar way to that of the first display example. Thus, the user can set a Tv/Av value and an ISO value in a dynamic and graphical manner. Moreover, the user can grasp a Tv/Av value having the optimum amount of light exposure in a dynamic and graphical manner.

1-4-6. Sixth Display Example

A sixth display example is now described with reference to FIG. 9. Even in the sixth display example, the control unit 16 displays the Tv/Av plane image 300 and the ISO bar image 400, but the sixth display example is different from the first display example in the following points.

The control unit 16 sets the ISO bar image 400 to have the length longer than that of the ISO bar image 400 of the first display example. The control unit 16 displays a maximum value specifying indicator 410b and a maximum value display image 410a near the upper end of the ISO bar image 400. The maximum value specifying indicator 410b has an arrow shape and indicates a point corresponding to the maximum value of ISO value in the ISO bar image 400. The control unit 16 displays a minimum value specifying indicator 420b and a minimum value display image 420a near the lower end of the ISO bar image 400. The maximum value specifying indicator 410b has an arrow shape and indicates a point corresponding to the maximum value of ISO value in the ISO bar image 400.

Furthermore, the control unit 16 calculates an optimum value of ISO value corresponding to the Tv/Av value and displays the ISO bar image 400 so that an intersection point P2 between the reference line 330 and the ISO bar image 400 indicates the calculated optimum value. The control unit 16 may display the ISO bar image 400 so that the intersection point P2 between the reference line 330 and the ISO bar image 400 indicates a predetermined initial value.

Moreover, the control unit 16 displays an ISO value adjustment arrow image 440 at the position of the point P2. The ISO value adjustment arrow image 440 has an arrow shape and indicates any point on the ISO bar image 400, that is, the ISO value. The control unit 16 moves the ISO value adjustment arrow image 440 in the direction of an arrow 400a or 400b depending on an input operation performed by the user. In this case, the input operation includes, for example, an operation of dragging and dropping the ISO value adjustment arrow image 440 and an operation of tapping a desired point on the ISO bar image 400. Then, the control unit 16 changes the setting value of the ISO value to the ISO value indicated by the ISO value adjustment arrow image 440. The movable range of the ISO value adjustment arrow image 440 is between the maximum value specifying indicator 410b and the minimum value specifying indicator 420b.

When the reference line 330 is moved, the control unit 16 causes the ISO bar image 400 to follow the reference line 330. Specifically, the control unit 16 calculates an optimum value of the ISO value corresponding to the changed Tv/Av value and moves the ISO bar image 400 so that the intersection point P2 between the reference line 330 and the ISO bar image 400 indicates the calculated optimum value. The control unit 16 may display the ISO bar image 400 so that the intersection point P2 indicates a predetermined initial value.

Furthermore, the control unit 16 sets a setting value of the ISO value to an optimum value and returns the ISO value adjustment arrow image 440 to the point P2 The control unit 16 may maintain the ISO value at the current value (the ISO value before change of Tv/Av value). In this case, the position of the ISO value adjustment arrow image 440 in the ISO bar image 400 is maintained at the position before change of Tv/Av value.

Moreover, the control unit 16 assigns the gradation of light and shade to the Tv/Av plane image 300 and the ISO bar image 400. This gradation may be omitted, or may be assigned to only one of the Tv/Av plane image 300 and the ISO bar image 400.

According to the sixth display example, the user can set the Tv/Av value and the ISO value in a graphical and dynamic (flexible) manner. In addition, the control unit 16 moves the ISO value adjustment arrow image 440 with the ISO bar image 400 being fixed at the time of adjusting the ISO value, thereby improving space efficiency of the display unit 14. Specifically, the control unit 16 fixes the ISO bar image 400 at the time of adjusting the ISO value, and thus it is possible to reduce a region of the through-the-lens image 1000 to be hidden by the ISO bar image 400. In addition, for example, when the ISO bar image 400 is moved upward during the adjustment of ISO value, the upper end of the ISO bar image 400 is more likely to protrude out of the display area of the display unit 14. However, in the present display example, the control unit 16 fixes the ISO bar image 400 during the adjustment of ISO value, and thus it is possible to reduce the possibility that the upper end of the ISO bar image 400 protrudes out of the display area of the display unit 14.

The control unit 16 may move only the gradation in the state where the ISO bar image 400 is fixed or may move only the numerical value in the setting value display image 430.

1-4-7. Seventh Display Example

A seventh display example is now described with reference to FIG. 10. Even in the seventh display example, the control unit 16 displays the Tv/Av plane image 300 and the ISO bar image 400, but the seventh display example is different from the first display example in the following points.

In other words, the control unit 16 displays a display window image 401 and displays the ISO bar image 400 inside the display window image 401. The control unit 16 fixes the position of the display window image 401. In addition, when the ISO bar image 400 protrudes out of the display window image 401, the control unit 16 causes the protruding portion to be not displayed (it can be transparently displayed).

According to the seventh display example, the user can set the Tv/Av value and the ISO value in a graphical and dynamic (flexible) manner. In addition, the control unit 16 displays the ISO bar image 400 in the display window image 401 and fixes the display window image 401, thereby improving space efficiency of the display unit 14. Specifically, the control unit 16 displays the ISO bar image 400 in the display window image 401, and thus it is possible to reduce a region of the through-the-lens image 1000 to be hidden by the ISO bar image 400. In addition, for example, when the ISO bar image 400 is set to be moved without displaying the display window image 401, the end portion of the ISO bar image 400 is likely to protrude out of the display window image 401 depending on the movement state of the ISO bar image 400. However, in the present display example, the control unit 16 causes a portion protruding out of the display window image 401 to be not displayed, and thus it is possible to reduce the possibility that the end portion the ISO bar image 400 protrudes out of the display area of the display unit 14.

1-4-8. Eighth Display Example

An eighth display example is now described with reference to FIGS. 11 and 12. Even in the eighth display example, the control unit 16 displays the Tv/Av plane image 300 and the ISO bar image 400, but the eighth display example is different from the first display example in the following points.

The control unit 16 displays the Tv/Av plane image 300 as shown in FIG. 11. The control unit 16 performs the same process on the Tv/Av plane image 300 as that of the first display example. The control unit 16 sets a Tv/Av value and moves the point P1 using the Tv/Av plane image 300 until there is a request for setting an ISO value from the user. The control unit 16 may display the reference line 330 or may not display the reference line 330. In addition, the request for setting the ISO value includes, for example, an operation of touching the point P1 with the finger for a predetermined time or more.

When there is a request for setting the ISO value from the user, the control unit 16 turns the Tv/Av plane image 300 to the inner side of the display unit 14 as shown in FIG. 12. Furthermore, the control unit 16 displays the ISO bar image 400 to pass through the point P1. The ISO bar image 400 extends in the direction perpendicular to the Tv/Av plane image 300. In addition, the control unit 16 displays the setting value display image 430, the maximum value display image 410a, and the minimum value display image 420a in a similar way to that of the first display example. In addition, the control unit 16 sets the ISO value indicated by the intersection point P1 between the ISO bar image 400 and the Tv/Av plane image 300 as the setting value of the ISO value. In addition, the control unit 16 moves the ISO bar image 400 in the direction of an arrow 400c or 400d depending on an input operation performed by the user. In this case, the input operation includes, for example, a way of tapping the ISO bar image 400 with the finger and dragging the finger in the direction of the arrow 400c or 400d. As a result, the ISO value indicated by the point P1 is also changed, and accordingly the setting value of the ISO value is changed.

When there is a request for setting the Tv/Av value from the user, the control unit 16 displays the Tv/Av plane image 300 shown in FIG. 11 by turning the Tv/Av plane image 300 to the front side of the display unit 14. In this case, the request for setting the Tv/Av value includes, for example, an operation of touching the point P1 with the finger for a predetermined time or more.

According to the eighth display example, the user can also set the Tv/Av value and the ISO value in a graphical and dynamic (flexible) manner. In addition, the Tv/Av plane image 300 and the ISO bar image 400 are displayed in a three dimensional format, and thus the user can grasp more intuitively the Tv/Av value and the ISO value.

The control unit 16 may display the Tv/Av plane image 300 shown in FIG. 12 instead of the Tv/Av plane image 300 shown in FIG. 11 and may set the Tv/Av value using the Tv/Av plane image 300.

1-4-9. Ninth Display Example

A ninth display example is now described with reference to FIG. 13. In this example, the control unit 16 displays an image similar to that of the sixth display example. However, the ninth display example is different from the sixth display example in that the ISO bar image 400 extends in the horizontal direction. The control unit 16 moves the ISO bar image 400 in the horizontal direction depending on an input operation performed by the user. Other processes related to the ISO bar image 400 may be similar to those of the first display example. According to this display example, the user can also set the Tv/Av value and the ISO value in a graphical and dynamic (flexible) manner.

The control unit 16 extends the ISO bar image 400 in the horizontal direction, thereby improving space efficiency of the display unit 14. In other words, the ISO bar image 400 is extended in the horizontal direction, and thus the control unit 16 enables the ISO bar image 400 to be displayed along the edge of the display unit 14. Thus, the ISO bar image 400 is less likely to interfere with other images. The ninth display example is also applicable to the display examples other than the sixth display example, for example, the first display example.

1-4-10. Tenth Display Example

A tenth display example is now described with reference to FIG. 14. In the display examples described above, the reference line 330 is set to be associated with the Tv/Av value having the constant amount of light exposure. However, the reference line 330 is not limited to this example. The tenth display example shows another example of the reference line 330.

The control unit 16 displays the Tv/Av plane image 300 in a similar way to that of the first display example, but the reference line 330 is extended in the vertical downward direction from the point P1. The control unit 16 displays the ISO bar image 400 at the underside of the Tv/Av plane image 300 and extends the ISO bar image 400 in the horizontal direction. The control unit 16 sets the ISO value indicated by the intersection point P2 between the reference line 330 and the ISO bar image 400 as a setting value of the ISO value. The control unit 16 moves the ISO bar image 400 in the horizontal direction depending on an input operation performed by the user. Other processes related to the ISO bar image 400 may be similar to those of the first display example.

According to this display example, the user can also set the Tv/Av value and the ISO value in a graphical and dynamic (flexible) manner.

The control unit 16 may omit the reference line 330. In addition, when the reference line 330 is omitted, it is not only necessary to arrange the point P2 in the vertical downward direction of the point P1. In other words, the control unit 16 can calculate an optimum value of the ISO value corresponding to the Tv/Av value and can display the point P2 that corresponds to the calculated optimum value on the ISO bar image 400. In addition, the control unit 16 displays a reference line, which passes through the point P2 and is perpendicular to the ISO bar image 400, and the control unit 16 moves the ISO bar image 400 in the horizontal direction depending on an input operation performed by the user. The control unit 16 can set an ISO value indicated by an intersection point between the reference line and the ISO bar image 400 as a setting value of the ISO value.

1-4-11. Eleventh Display Example

An eleventh display example is now described with reference to FIGS. 15 and 16. In the display examples described above, the ISO bar image 400 is displayed as a separate image from the Tv/Av plane image 300. However, the ISO bar image 400 may be incorporated into the Tv/Av plane image 300. The eleventh and twelfth display examples show examples in which the ISO bar image 400 is incorporated into the Tv/Av plane image 300.

The control unit 16 displays the Tv/Av plane image 300 and the reference line 330 in similar way to that of the first display example. In addition, the control unit 16 displays other images, that is, the dial image 500, the focus mode selection image 600, and the shooting parameter display image 700.

Furthermore, the control unit 16 extends an ISO adjustment linear image 450 in the direction perpendicular to the reference line 330 from the point P1 in order to clearly indicate that the ISO bar image 400 is incorporated into the Tv/Av plane image 300. Moreover, the control unit 16 displays an ISO decrease indicator 450b on the upper end of the ISO adjustment linear image 450 and displays an ISO increase indicator 450a on the lower end of the ISO adjustment linear image 450. The ISO adjustment linear image 450, the ISO increase indicator 450a, and the ISO decrease indicator 450b indicate the operation direction for adjusting the ISO value.

The control unit 16 sets the Tv/Av value and moves the point P1 using the Tv/Av plane image 300 until there is a request for setting the ISO value from the user. In addition, the control unit 16 causes the reference line 330 and the ISO adjustment linear image 450 to follow the point P1. The control unit 16 may display the reference line 330 or may not display the reference line 330. In addition, the request for setting the ISO value includes, for example, an operation of touching the point P1 with the finger for a predetermined time or more.

When there is a request for setting the ISO value from the user, the control unit 16 erases the dial image 500 and the focus mode selection image 600 as shown in FIG. 16, and the control unit 16 assigns the gradation of light and shade to the Tv/Av plane image 300. This gradation of light and shade indicates the ISO value similarly to the second display example.

The control unit 16 moves the entire gradation depending on an input operation performed by the user. For example, when the user drags the finger in the lower right direction, the control unit 16 moves the entire gradation in the lower right direction. In this case, the brightness of the point P1 increases. On the other hand, when the user drags the finger in the upper left direction, the control unit 16 moves the entire gradation in the upper left direction. In this case, the brightness of the point P1 decreases. The control unit 16 sets the ISO value corresponding to the brightness of the point P as the setting value of the ISO value.

When there is a request for setting the Tv/Av value from the user, the control unit 16 displays the Tv/Av plane image 300 and the like as shown in FIG. 15.

According to the eleventh display example, the user can set the Tv/Av value and the ISO value in a graphical and dynamic (flexible) manner. Furthermore, the ISO value is displayed with the gradation of light and shade, and thus the user can grasp more intuitively the Tv/Av value and the ISO value. In addition, user can easily grasp the operation direction for increasing or decreasing an ISO value by referring to the gradient direction of the gradation of light and shade, the ISO adjustment linear image 450, the ISO increase indicator 450a, and the ISO decrease indicator 450b. In addition, the gradation of light and shade is displayed during the setting of the ISO value, and thus when the user does not perform setting of the ISO value, it is possible for the user to concentrate on a subject to be captured.

1-4-12. Twelfth Display Example

A twelfth display example is now described with reference to FIGS. 17 and 18. The control unit 16 displays the Tv/Av plane image 300 and the reference line 330 in a similar way to that of the first display example. In addition, the control unit 16 displays other images, that is, the dial image 500, the focus mode selection image 600, and the shooting parameter display image 700.

Furthermore, the control unit 16 displays the ISO setting value display image 430 near the point P1 in order to clearly indicate that the ISO bar image 400 is incorporated into the Tv/Av plane image 300. The ISO value indicated by the ISO setting value display image 430 may be, for example, an optimum value corresponding to the Tv/Av value or an initial value set in advance. The optimum value is calculated by the control unit 16.

When there is a request for setting the ISO value from the user, the control unit 16 erases the dial image 500 and the focus mode selection image 600 as shown in FIG. 18. The request for setting the ISO value includes, for example, an operation of touching the point P1 with the finger for a predetermined time or more. Moreover, the control unit 16 displays a background image 470 behind the Tv/Av plane image 300 and assigns the gradation of light and shade to the background image 470. The gradation of light and shade indicates the ISO value similarly to the second display example.

The control unit 16 displays an ISO increase arrow image 460*a* that extends to the lower right direction from the point P1 and an ISO decrease arrow image 460*b* that extends to the upper left direction from the point P1. Furthermore, the control unit 16 displays an ISO increase indicator 460*a*-1 on the tip of the ISO increase arrow image 460*a* and an ISO decrease indicator 460*b*-1 on the tip of the ISO decrease arrow image 460*b*. The ISO increase arrow image 460*a*, the ISO increase indicator 460*a*-1, the ISO decrease arrow image 460*b*, and the ISO decrease indicator 460*b*-1 indicate the operation direction for adjusting the ISO value.

The control unit 16 moves the background image 470, that is, the entire gradation depending on an input operation performed by the user. For example, when the user drags the linger in the lower right direction, the control unit 16 moves the background image 470 in the lower right direction. In this case, the brightness of the point P1 increases. On the other hand, when the user drags the finger m the upper left direction, the control unit 16 moves the background image 470 in the upper left direction. In this case, the brightness of the point P1 decreases. The control unit 16 sets the ISO value corresponding to the brightness of the point P1 as the setting value of the ISO value.

When there is a request for setting the Tv/Av value from the user, the control unit 16 displays the Tv/Av plane image 300 and the like as shown in FIG. 17.

According to the twelfth display example, the user can set the Tv/Av value and the ISO value in a graphical and dynamic (flexible) manner. Furthermore, the ISO value is displayed with the gradation of light and shade, and thus the user can grasp more intuitively the Tv/Av value and the ISO value. In addition, user can easily grasp the operation direction for increasing or decreasing an ISO value by referring to the gradient direction of the gradation of light and shade, the ISO increase arrow image 460*a*, the ISO increase indicator 460*a*-1, and the like.

1-4-13. Thirteenth Display Example

A thirteenth display example is now described with reference to FIG. 19. In the thirteenth display example, the control unit 16 displays an undo button 810, a reset button 820, and a lock button 830, in addition to images similar to those of the first display example. When the user taps the undo button 810, the control unit 16 returns the state of each image to the state of the operation performed previously by one operation by the user. When the reset button 820 is tapped, the control unit 16 returns the display state to its initial state. In other words, the control unit 16 calculates an optimum value of the Tv/Av value and the ISO value, control unit 16 adjusts the positions of the point P1, the reference line 330, and the ISO bar image 400 based on the calculated optimal value. When the lock button 830 is tapped, the control unit 16 rejects (refuse to accept) an input operation performed by the user. When the lock button 830 is tapped again, the control unit 16 accepts an input operation performed by the user.

According to this display example, the user can set the Tv/Av value and the ISO value in a graphical and dynamic (flexible) manner. Furthermore, the usability of the Tv/Av plane image 300 and the ISO bar image 400 for the user is improved.

The display examples described above may be combined appropriately. For example, the gradation of light and shade may be applied to any display example other than the second display example. In addition, the undo button 810, the reset button 820, and the lock button 830 shown in the thirteenth display example may be displayed in other display examples. In addition, any of the undo button 810, the reset button 820, and the lock button 83 may be omitted. Some of these buttons may be a hard key.

As described above, according to the first embodiment, the information processing apparatus 10 displays the first setting image for setting the first shooting parameter and the second setting image for setting the second shooting parameter in association with each other. Thus, the user can set a plurality of shooting parameters while viewing a plurality of setting images associated with each other. Accordingly, the user, when setting a plurality of shooting parameters using a plurality of setting images, can intuitively grasp the relevance between these shooting parameters, and eventually, the user can intuitively set these shooting parameters.

The information processing apparatus 10 displays the second setting image on a position corresponding to a setting value of the first shooting parameter. Thus, the user can intuitively grasp a plurality of shooting parameters.

More specifically, the information processing apparatus 10 performs control of displaying the reference line corresponding to the setting value of the first shooting parameter and displays the second setting image on the position that intersects the second setting image. Thus, the user can intuitively grasp a plurality of shooting parameters.

More specifically, each point on the second setting image indicates a value of the second shooting parameter, and the information processing apparatus 10 sets a point in which the second setting image intersects the reference line as a setting value of the second shooting parameter. Thus, the user can intuitively grasp a plurality of shooting parameters.

More specifically, the information processing apparatus 10 displays a space image (for example, a plane image) for setting a plurality of shooting parameters as the first setting image. Thus, the user can intuitively grasp a plurality of the first shooting parameters.

More specifically, the information processing apparatus 10 displays the Tv/Av plane image 300 for setting shutter speed (Tv) and aperture (Av) as the first setting image, and the information processing apparatus 10 displays the ISO bar image 400 for setting an ISO value as the second setting image. Thus, the user can intuitively grasp the Tv/Av value and the ISO value.

In addition, the information processing apparatus 10 incorporates the second setting image into the first setting image, and thus the user can intuitively grasp a plurality of shooting parameters.

In addition, the information processing apparatus 10 causes the second setting image to be included in a background image of the first setting image, and thus the user can intuitively grasp the plurality of shooting parameters.

2. Second Embodiment

A second embodiment is now described. In the second embodiment, the information processing apparatus and the imaging device are separate components.

2-1. Overall Configuration of Information Processing System

The configuration of the information processing system according to the second embodiment is now described with reference to FIG. 20. The information processing system includes the information processing apparatus 10 and the imaging device 20. The information processing apparatus 10 and the imaging device 20 can communicate with each other. The information processing apparatus 10 performs a process similar to that of the first embodiment described above. However, the information processing apparatus 10 acquires a through-the-lens image and a captured image through communication with the imaging device 20. In addition, the information processing apparatus 10 outputs the setting value information related to a setting value of the Tv/Av value and the ISO value to the imaging device 20.

2-2. Configuration of Imaging Device

The configuration of the information processing apparatus 10 is substantially similar to that of the first embodiment. In the second embodiment, the information processing apparatus 10 may not include the imaging unit 13. The configuration of the imaging device 20 is now described.

As shown in FIG. 21, the imaging device 20 includes a storage unit 21, a communication unit 22, an imaging unit 23, a display unit 24, an operation unit 25, and a control unit 26. The storage unit 21 stores a program which causes the imaging device 20 to execute functions of the storage unit 21, the communication unit 22, the imaging unit 23, the display unit 24, the operation unit 25, and the control unit 26. The storage unit 21 also stores various types of image information.

The communication unit 22 communicates with the information processing apparatus 10. For example, the communication unit 22 transmits the through-the-lens image supplied from the control unit 26 to the information processing apparatus 10. In addition, the communication unit 22 outputs the setting value information supplied from the information processing apparatus 10 to the control unit 26. The imaging unit 23 captures an image. Specifically, the imaging unit 23 outputs an image captured by an image sensor to the control unit 26 as a through-the-lens image until the user performs a shooting operation (for example, an operation of depressing a shutter button that is not shown). When the user performs a shooting operation, the imaging unit 23 performs an imaging (specifically, performs an action such as releasing a shutter) corresponding on the setting value of the Tv/Av value and ISO value. Then, the imaging unit 23 outputs the image captured by the image sensor to the control unit 26 as a captured image.

The display unit 24 displays various types of images, for example, a through-the-lens image and a captured image. The display unit 24 may display the setting value of the Tv/Av value and ISO value. The operation unit 25 includes a so-called hard key, which is disposed on each site of the imaging device 20. The operation unit 25 outputs operation information related to the input operation performed by the user to the control unit 26. The control unit 26 controls the entire imaging device 20 and outputs the through-the-lens image to the communication unit 22. In addition, the control unit 26 performs setting of the imaging unit 23 based on the setting value information.

The imaging device 20 has the hardware configuration shown in FIG. 22, and such hardware configuration allows the storage unit 21, the communication unit 22, the imaging unit 23, the display unit 24, the operation unit 25, and the control unit 26 to be implemented.

In other words, the imaging device 20 is configured to include a non-volatile memory 201, a RAM 202, a communication device 203, an imaging hardware 204, a display 205, an operation device (for example, a hard key) 206, and a CPU 207, as its hardware configuration.

The non-volatile memory 201 stores, for example, various programs and image information. The program stored in the non-volatile memory includes a program which causes the imaging device 20 to execute functions of the storage unit 21, the communication unit 22, the imaging unit 23, the display unit 24, the operation unit 25, and the control unit 26.

The RAM 202 is used as a work area of the CPU 207. The communication device 203 communicates with the information processing apparatus 10. The imaging hardware 204 has a configuration similar to that of the imaging device 104. In other words, the imaging hardware 204 captures an image and generates a captured image. The display 205 displays various types of image information. The display 205 may output audio information. The operation device 206 accepts various input operations performed by the user.

The CPU 207 reads out and executes the program stored in the non-volatile memory 201. Thus, the CPU 207, which reads out and executes the program stored in the non-volatile memory 201, allows the imaging device 20 to execute functions of the storage unit 21, the communication unit 22, the imaging unit 23, the display unit 24, the operation unit 25, and the control unit 26. In other words, the CPU 207 functions as a component for practically operating the imaging device 20.

2-3. Process Procedure of Information Processing System

The process performed by the information processing system is similar to the process performed by the information processing apparatus 10 described above. However, the information processing system is different from the first embodiment in that the imaging device 20 creates a through-the-lens image and transmits it to the information processing apparatus 10 and the information processing apparatus 10 transmits the setting value information to the imaging device 20. The first to thirteenth display examples are applicable to the second embodiment.

According to the second embodiment, the user can set the Tv/Av value and the ISO value in a graphical and dynamic (flexible) manner. In addition, the user can remotely operate a shooting parameter for the imaging device 20 using the information processing apparatus 10, thereby further improving the usability of the Tv/Av plane image 300 and the ISO bar image 400.

According to the first and second embodiments, the above and other advantages will become apparent from the description given herein.

The preferred embodiments of the present disclosure have been described above in detail with reference to the accompanying drawings, but the technical scope of the present disclosure is not limited to the above examples. A person skilled in the art may find various alterations and modifications within the scope of the appended claims, and it should be understood that they will naturally come under the technical scope of the present disclosure.

The embodiments of the present disclosure may include at least the following configurations:

(1) An electronic apparatus comprising:
a processor; and
a memory having program code stored thereon, the program code being such that,
when it is executed by the processor, it causes the processor to:
control a display of a first parameter-setting image that relates to values of one or more parameters related to imaging, the first parameter-setting image comprising a graph and an indicator point that is movable by user input, where the values of the one or more parameters related to imaging are set based on a location of the indicator point in the graph; and
display, in association with the first parameter-setting image, a second parameter-setting image that relates to values of at least one additional parameter related to imaging.

(2) The electronic apparatus of (1),
wherein the first parameter-setting image enables the user to set values of a first parameter related to imaging and a second parameter related to imaging based on the location of the indicator point in the graph; and
the second parameter-setting image enables the user to set values of a third parameter related to imaging.

(3) The electronic apparatus of any of (1) and (2),
wherein at least a portion of the second parameter-setting image is movable relative to the first parameter-setting image by user input and the value of the third parameter is set based on a location of the portion of the second parameter-setting image relative to the first parameter-setting image.

(4) The electronic apparatus of any of (1) through (3),
wherein the second parameter-setting image is displayed in association with the first parameter-setting image by extending a reference line from the graph of the first parameter-setting image to contact the second parameter-setting image, the reference line passing through the indicator point.

(5) The electronic apparatus of any of (1) through (4),
wherein the second parameter-setting image comprises a bar image that is slidable by the user relative to the reference line.

(6) The electronic apparatus of any of (1) through (5),
wherein the reference line is such that each point thereof indicates a same amount of total exposure as the indicator point.

(7) The electronic apparatus of any of (1) through (6),
wherein, when the indicator point is moved by the user, the reference line moves with the indicator point and the second parameter-setting image moves so as maintain a same point of contact between the reference line and the second parameter-setting image.

(8) The electronic apparatus of any of (1) through (7),
wherein the first parameter is a shutter speed parameter and the second parameter is an aperture parameter, and
the graph of the first parameter-setting image includes a gradation that varies by position in the graph so as to indicate a relative exposures for the shutter speed and aperture parameter-settings corresponding to the respective position.

(9) The electronic apparatus of any of (1) through (8),
wherein the third parameter is an ISO parameter, and
the second parameter-setting image comprises a bar image that includes a gradation that varies by position in the bar image so as to indicate a relative exposure for the ISO setting corresponding to the respective position.

(10) The electronic apparatus of any of (1) through (9),
wherein the second parameter-setting image is displayed in association with the first parameter-setting image by displaying the second parameter-setting image within the graph of the first parameter-setting image next to the indicator point, and
the second parameter-setting image includes increase and decrease buttons that,
when selected, increase or decrease the value of the third parameter.

(11) The electronic apparatus of any of (1) through (10),
wherein the program code is such that, when it is executed by the processor, it further causes the processor to provide the user options to select from among a plurality of imaging modes including first, second, and third imaging modes,
when the first imaging mode is selected, the indicator point may be freely moved by the user within the graph to any available positions,
when either of the second and third imaging modes is selected, the location of the indicator point is restricted so as to maintain a predetermined exposure,
when the second imaging mode is selected, the user is allowed to move the indicator point only in an second parameter-changing direction, and in response to the indicator point being moved by the user in the second parameter-changing direction, the indicator point is automatically moved in a first parameter-changing direction by an amount that maintains the predetermined exposure,
when the third imaging mode is selected, the user is allowed to move the indicator point only in a first parameter-changing direction, and in response to the indicator point being moved by the user in the first parameter-changing direction, the indicator point is automatically moved in the second parameter-changing direction by an amount that maintains the predetermined exposure.

(12) The electronic apparatus of any of (1) through (1),
wherein, when the first imaging mode is selected the user can freely move the indicator point within the graph by a tap operation or by a drag-and-drop operation,
when the second imaging mode is selected, the first parameter-setting image includes a slider bar along a second parameter axis and the user can move the indicator point only by moving the slider bar in the second parameter-changing direction, and
when the third imaging mode is selected, the first parameter-setting image includes a slider bar along a first parameter axis and the user can move the indicator point only by moving the slider bar in the first parameter-changing direction.

(13) The electronic apparatus of any of (1) through (12), further comprising:
an imaging device that captures images based on the one or more parameters related to imaging and on the at least one additional parameter related to imaging.

(14) The electronic apparatus of any of (1) through (13), further comprising:
a display device,
wherein the program code is such that, when it is executed by the processor, it further causes the processor to display, via the display device, the first and second parameter-setting images superimposed over a through-the-lens image captured by the imaging device.

(15) The electronic apparatus of any of (1) through (14),
wherein as the values of any of the one or more parameters related to imaging and/or the at least one additional parameter related to imaging are changed by way of the first and second parameter-setting images, the through-the-lens image that is displayed is updated in real time to reflect the changing values of the parameters.

(16) The electronic apparatus of any of (1) through (15), further comprising:
a communications unit configured to communicate with a separated device that is paired to the electronic apparatus, wherein the processor displays the first and second parameter-setting images by communicating the first and second parameter-setting images to the paired device with instructions to display the images thereon.

(17) The electronic apparatus of any of (1) through (16), wherein the value of the third parameter is set based on a location of the second parameter-setting image relative to the first parameter-setting image.

(18) A non-transitory computer readable medium having program code stored thereon, the program code being such that, when it is executed by an information processing device, it causes the information processing device to:
display a first parameter-setting image that relates to values of one or more parameters related to imaging, the first parameter-setting image comprising a graph and an indicator point that is movable by user input, where the values of the one or more parameters related to imaging are set based on a location of the indicator point m the graph; and
display, in association with the first parameter-setting image, a second parameter-setting image that relates to values of at least one additional parameter related to imaging.

(19) The non-transitory computer readable medium of (18), wherein the first parameter-setting image enables the user to set values of a first parameter related to imaging and a second parameter related to imaging based on the location of the indicator point in the graph; and
the second parameter-setting image enables the user to set values of a third parameter related to imaging.

(20) The non-transitory computer readable medium of any of (18) and (19),
wherein at least a portion of the second parameter-setting image is movable relative to the first parameter-setting image by user input and the value of the third parameter is set based on a location of the portion of the second parameter-setting image relative to the first parameter-setting image.

(21) The non-transitory computer readable medium of any of (18) through (20),
wherein the second parameter-setting image is displayed in association with the first parameter-setting image by extending a reference line from the graph of the first parameter-setting image to contact the second parameter-setting image, the reference line passing through the indicator point.

(22) The non-transitory computer readable medium of any of (18) through (21),
wherein the ISO parameter is set based on a location at which the reference line intersects the second parameter-setting image.

(23) The non-transitory computer readable medium of any of (18) through (22),
wherein the second parameter-setting image comprises a bar image that is slidable by the user relative to the reference line.

(24) The non-transitory computer readable medium of any of (18) through (23),
wherein the reference line is such that each point thereof indicates a same amount of total exposure as the indicator point.

(25) The non-transitory computer readable medium of any of (18) through (24),
wherein, when the indicator point is moved by the user, the reference line moves with the indicator point and the second parameter-setting image moves so as maintain a same point of contact between the reference line and the second parameter-setting image.

(26) The non-transitory computer readable medium of any of (18) through (25),
wherein the graph of the first parameter-setting image includes a gradation that varies by position in the graph so as to indicate a relative exposures for the shutter speed and aperture parameter-settings corresponding to the respective position.

(27) The non-transitory computer readable medium of any of (18) through (26),
wherein the second parameter-setting image comprises a bar image that includes a gradation that varies by position in the bar image so as to indicate a relative exposure for the ISO setting corresponding to the respective position.

(28) The non-transitory computer readable medium of any of (18) through (27),
wherein the second parameter-setting image is displayed in association with the first parameter-setting image by displaying the second parameter-setting image within the graph of the first parameter-setting image next to the indicator point, and
the second parameter-setting image includes increase and decrease buttons that,
when selected, increase or decrease the value of the ISO parameter.

(29) The non-transitory computer readable medium of any of (18) through (28),
wherein the program code is such that, when it is executed by the processor, it further causes the processor to provide the user options to select from among a plurality of imaging modes including first, second, and third imaging modes,
when the first imaging mode is selected, the indicator point may be freely moved by the user within the graph to any available positions,
when either of the second and third imaging modes is selected, the location of the indicator point is restricted so as to maintain a predetermined exposure,
when the second imaging mode is selected, the user is allowed to move the indicator point only in an aperture-changing direction, and in response to the indicator point being moved by the user in the aperture-changing direction, the indicator point is automatically moved in a shutter speed-direction by an amount that maintains the predetermined exposure,
when the third imaging mode is selected, the user is allowed to move the indicator point only in a shutter speed-changing direction, and in response to the indicator point being moved by the user in the shutter speed-changing direction, the indicator point is automatically moved in the aperture changing-direction by an amount that maintains the predetermined exposure.

(30) The non-transitory computer readable medium of any of (18) through (29),
wherein, when the first imaging mode is selected the user can freely move the indicator point within the graph by a tap operation or by a drag-and-drop operation,
when the second imaging mode is selected, the first parameter-setting image includes a slider bar along an aperture axis and the user can move the indicator point only by moving the slider bar in the aperture-changing direction, and when the third imaging mode is selected, the first parameter-setting image includes a slider bar along a shutter speed axis and the user can move the indicator point only by moving the slider bar in the shutter speed-changing direction.

(31) A method of operating an the information processing device, comprising causing the information processing device to:

display a first parameter-setting image that relates to values of one or more parameters related to imaging, the first parameter-setting image comprising a graph and an indicator point that is movable by user input, where the values of the one or more parameters related to imaging are set based on a location of the indicator point in the graph; and display, in association with the first parameter-setting image, a second parameter-setting image that relates to value of at least one additional parameter related to imaging.

(32) The method of (31), wherein the first parameter-setting image enables the user to set values of a first parameter related to imaging and a second parameter related to imaging based on the location of the indicator point in the graph; and the second parameter-setting image enables the user to set values of a third parameter related to imaging.

(33) The method of any of (31) and (32), wherein at least a portion of the second parameter-setting image is movable relative to the first parameter-setting image by user input and the value of the third parameter is set based on a location of the portion of the second parameter-setting image relative to the first parameter-setting image.

(34) The method of any of (31) through (33), wherein the second parameter-setting image is displayed in association with the first parameter-setting image by extending a reference line from the graph of the first parameter-setting image to contact the second parameter-setting image, the reference line passing through the indicator point.

(35) The method of any of (31) through (34), wherein the ISO parameter is set based on a location at which the reference line intersects the second parameter-setting image.

(36) The method of any of (31) through (35), wherein the second parameter-setting image comprises a bar image that is slidable by the user relative to the reference line.

(37) The method of any of (31) through (36), wherein the reference line is such that each point thereof indicates a same amount of total exposure as the indicator point.

(38) The method of any of (31) through (37), wherein, when the indicator point is moved by the user, the reference line moves with the indicator point and the second parameter-setting image moves so as maintain a same point of contact between the reference line and the second parameter-setting image.

(39) The method of any of (31) through (38).

wherein the graph of the first parameter-setting image includes a gradation that varies by position in the graph so as to indicate a relative exposures for the shutter speed and aperture parameter-settings corresponding to the respective position.

(40) The method of any of (31) through (39), wherein the second parameter-setting image comprises a bar image that includes a gradation that varies by position in the bar image so as to indicate a relative exposure for the ISO setting corresponding to the respective position.

(41) The method of any of (31) through (40).

wherein the second parameter-setting image is displayed in association with the first parameter-setting image by displaying the second parameter-setting image within the graph of the first parameter-setting image next to the indicator point, and the second parameter-setting image includes increase and decrease buttons that, when selected, increase or decrease the value of the ISO parameter.

(42) The method of any of (31) through (41), further comprising causing the information processing device to provide the user options to select from among a plurality of imaging modes including first, second, and third imaging modes, wherein, when the first imaging mode is selected, the indicator point may be freely moved by the user within the graph to any available positions, when either of the second and third imaging modes is selected, the location of the indicator point is restricted so as to maintain a predetermined exposure, when the second imaging mode is selected, the user is allowed to move the indicator point only in an aperture-changing direction, and in response to the indicator point being moved by the user in the aperture-changing direction, the indicator point is automatically moved in a shutter speed-direction by an amount that maintains the predetermined exposure, when the third imaging mode is selected, the user is allowed to move the indicator point only in a shutter speed-changing direction, and in response to the indicator point being moved by the user in the shutter speed-changing direction, the indicator point is automatically moved in the aperture changing-direction by an amount that maintains the predetermined exposure.

(43) The method of any of (31) through (42), wherein, when the first imaging mode is selected the user can freely move the indicator point within the graph by a tap operation or by a drag-and-drop operation, when the second imaging mode is selected, the first parameter-setting image includes a slider bar along an aperture axis and the user can move the indicator point only by moving the slider bar in the aperture-changing direction, and when the third imaging mode is selected, the first parameter-setting image includes a slider bar along a shutter speed axis and the user can move the indicator point only by moving the slider bar in the shutter speed-changing direction.

(A01) An information processing apparatus including:

a control unit configured to perform control of displaying a first setting image and a second setting image in association with each other, the first setting image being used to set a first shooting parameter related to imaging, the second setting image being used to set a second shooting parameter related to imaging; and an input operation unit configured to be capable of performing an input operation for setting the first shooting parameter and the second shooting parameter.

(A02) The information processing apparatus according to (A01), wherein the control unit performs control of displaying the second setting image at a position corresponding to a setting value of the first shooting parameter.

(A03) The information processing apparatus according to (A02), wherein the control unit performs control of displaying a reference line corresponding to the setting value of the first shooting parameter and displays the second setting image at a position intersecting the reference line.

(A04) The information processing apparatus according to (A03), wherein a point on the second setting image indicates a value of the second shooting parameter, and
wherein the control unit sets a point at which the second setting image intersects the reference line as the setting value of the second shooting parameter.
(A05) The information processing apparatus according to any one of (A01) to (A04),
wherein the control unit performs control of displaying a space image for setting a plurality of the first shooting parameters as the first setting image.
(A06) The information processing apparatus according to (A05),
wherein the first shooting parameter includes a shutter speed and an aperture value, and
wherein the second shooting parameter includes an ISO value.
(A07) The information processing apparatus according to (A06), wherein the control unit performs control of displaying a plane image for setting a shutter speed and an aperture value as the first setting image and control of displaying a bar image for setting an ISO value as the second setting image.
(A08) The information processing apparatus according to (A01) or (A02), wherein the control unit incorporates the second setting image into the first setting image.
(A09) The information processing apparatus according to (A08), wherein the control unit causes the second setting image to be included in a background image of the first setting image.
(A10) An information processing method including:
performing control of displaying a first setting image and a second setting image in association with each other, the first setting image being used to set a first shooting parameter related to imaging, the second setting image being used to set a second shooting parameter related to imaging; and
setting the first shooting parameter and the second shooting parameter depending on an input operation.
(A11) A program for causing a computer to realize:
a control function of performing control of displaying a first setting image and a second setting image in association with each other, the first setting image being used to set a first shooting parameter related to imaging, the second setting image being used to set a second shooting parameter related to imaging; and
an input operation function of performing an input operation capable of setting the first shooting parameter and the second shooting parameter.

REFERENCE SIGNS LIST 10 information processing apparatus
11, 21 storage unit
12, 22 communication unit
13, 23 imaging unit
14, 24 display unit
15, 25 operation unit
16, 26 control unit
20 imaging device
101, 201 non-volatile memory
102, 202 RAM
103, 203 communication device
104 imaging device
105, 205 display
106 touch panel
204 imaging hardware
206 operation device (hard key and other device)
210 display layer indicator
300 Tv/Av plane image
330 reference line
340, 350 slider bar image
400 ISO bar image
401 display window image
470 background image
500 dial image
600 focus mode selection image
700 shooting parameter display image
800 shooting button
810 undo button
820 reset button
830 lock button
1000 through-the-lens image (captured image)

What is claimed is:
1. An electronic apparatus, comprising:
one or more processors; and
a memory configured to store instructions,
wherein the one or more processors are configured to execute the instructions to:
control a display device to display a first parameter-setting image that relates to at least a first parameter related to imaging,
wherein the first parameter-setting image comprises a graph and an indicator point,
wherein the indicator point corresponds to an input from a user, and
wherein a first value of the at least first parameter related to imaging is based on a location of the indicator point in the graph; and
control, based on the location of the indicator point, the display device to display a second parameter-setting image that relates to at least a second parameter related to imaging.
2. The electronic apparatus of claim 1,
wherein the first parameter-setting image prompts the user to set values of a fourth parameter related to imaging and a fifth parameter related to imaging, and
wherein the second parameter-setting image prompts the user to set a second value of a third parameter related to imaging.
3. The electronic apparatus of claim 2, wherein the one or more processors are further configured to execute the instructions to:
move at least a portion of the second parameter-setting image relative to the first parameter-setting image based on the input, and
wherein the second value of the third parameter is based on a location of the at least portion of the second parameter-setting image relative to the first parameter-setting image.
4. The electronic apparatus of claim 3, wherein the one or more processors are further configured to control the display device to display a reference line that extends from the graph of the first parameter-setting image to the second parameter-setting image,
wherein the reference line passes via the indicator point.
5. The electronic apparatus of claim 3,
wherein the second parameter-setting image comprises a bar image, and
wherein the one or more processors are further configured to execute the instructions to control the display device to display the bar image based on a slide operation of the user.
6. The electronic apparatus of claim 4, wherein each point on the reference line indicates a same amount of total exposure as the indicator point.

7. The electronic apparatus of claim 4, wherein the one or more processors are further configured to move, based on movement of the indicator point by the user, the reference line and the second parameter-setting image, to maintain a same point of contact between the reference line and the second parameter-setting image.

8. The electronic apparatus of claim 2,
wherein the fourth parameter is a shutter speed parameter and the fifth parameter is an aperture parameter,
wherein the graph of the first parameter-setting image includes a gradation that varies by position in the graph, and
wherein the gradation indicates a relative exposure for the shutter speed parameter and the aperture parameter that correspond to a respective position in the graph.

9. The electronic apparatus of claim 2,
wherein the third parameter is an ISO parameter,
wherein the second parameter-setting image comprises a bar image that includes a gradation that varies by position in the bar image, and
wherein the gradation indicates a relative exposure for the ISO parameter that corresponds to a respective position in the graph.

10. The electronic apparatus of claim 2,
wherein the one or more processors are further configured to control the display device to display the second parameter-setting image within the graph of the first parameter-setting image, and
wherein the second parameter-setting image includes increase and decrease buttons to increase and decrease the second value of the third parameter respectively.

11. The electronic apparatus of claim 2, wherein the one or more processors are further configured to:
control the display device to display a plurality of imaging modes including a first imaging mode, second imaging mode, and a third imaging mode,
wherein in the first imaging mode, the indicator point is freely moved by the user within the graph to any available position,
wherein in one of the second imaging mode or the third imaging mode, the location of the indicator point is restricted to maintain a threshold exposure,
wherein in the second imaging mode, the user moves the indicator point in a second parameter-changing direction to move the indicator point in a first parameter-changing direction by a first amount that maintains the threshold exposure, and
wherein in the third imaging mode, the user moves the indicator point in the first parameter-changing direction to move the indicator point in the second parameter-changing direction by a second amount that maintains the threshold exposure.

12. The electronic apparatus of claim 11,
wherein, in the first imaging mode the user moves the indicator point within the graph by one of a tap operation or a drag-and-drop operation,
wherein in the second imaging mode, the first parameter-setting image includes a first slider bar along a second parameter axis and the user moves the indicator point by moving the first slider bar in the second parameter-changing direction, and
wherein in the third imaging mode, the first parameter-setting image includes a second slider bar along a first parameter axis and the user moves the indicator point by moving the second slider bar in the first parameter-changing direction.

13. The electronic apparatus of claim 1, further comprising:
an imaging device configured to capture images based on the at least first parameter related to imaging and the at least second parameter related to imaging.

14. The electronic apparatus of claim 13, further comprising:
the display device configured to display a through-the-lens image captured by the imaging device,
wherein the one or more processors are further configured to control the display device to display the first parameter-setting image and second parameter-setting image, such that both the first parameter-setting image and second parameter-setting image are superimposed over the through-the-lens image.

15. The electronic apparatus of claim 14, wherein the one or more processors are further configured to:
change, at least one of the first value of the at least first parameter related to imaging or a second value of the at least second parameter related to imaging, based on the first parameter-setting image and the second parameter-setting image; and
update the through-the-lens image to reflect the change in the at least one of the first value or the second value.

16. The electronic apparatus of claim 13, further comprising:
a communication unit configured to communicate with a separated device,
wherein the one or more processors are further configured to execute the instructions to:
transmit the first parameter-setting image and the second parameter-setting image to the separated device,
wherein the separated device displays the first parameter-setting image and the second parameter-setting image.

17. The electronic apparatus of claim 2, wherein the second value of the third parameter is based on a location of the second parameter-setting image relative to the first parameter-setting image.

18. A non-transitory computer readable medium having stored thereon, computer-executable instructions, which when executed by an information processing device, cause the information processing device to execute operations, the operations comprising:
controlling a display device to display a first parameter-setting image that relates to at least a first parameter related to imaging,
wherein the first parameter-setting image comprises a graph and an indicator point,
wherein the indicator point corresponds to an input from a user, and
wherein a first value of the at least first parameter related to imaging is based on a location of the indicator point in the graph; and
controlling, based on the location of the indicator point, the display device to display a second parameter-setting image that relates to at least a second parameter related to imaging.

19. The non-transitory computer readable medium of claim 18,
wherein the first parameter-setting image prompts the user to set values of a fourth parameter related to imaging and a fifth parameter related to imaging, and
wherein the second parameter-setting image prompts the user to set a second value of a third parameter related to imaging.

20. The non-transitory computer readable medium of claim 19, wherein the operations further comprising:
- moving at least a portion of the second parameter-setting image relative to the first parameter-setting image based on the input, and
- wherein the second value of the third parameter is based on a location of the at least portion of the second parameter-setting image relative to the first parameter-setting image.

* * * * *